(12) United States Patent
Shimizu et al.

(10) Patent No.: US 11,109,424 B2
(45) Date of Patent: Aug. 31, 2021

(54) CONNECTION CONTROL METHOD AND CONNECTION CONTROL DEVICE

(71) Applicant: NTT DOCOMO, INC., Chiyoda-ku (JP)

(72) Inventors: Masayoshi Shimizu, Chiyoda-ku (JP); Atsushi Minokuchi, Chiyoda-ku (JP); Takuya Shimojou, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 16/078,245

(22) PCT Filed: Mar. 14, 2017

(86) PCT No.: PCT/JP2017/010225
§ 371 (c)(1),
(2) Date: Aug. 21, 2018

(87) PCT Pub. No.: WO2017/169744
PCT Pub. Date: Oct. 5, 2017

(65) Prior Publication Data
US 2019/0053297 A1 Feb. 14, 2019

(30) Foreign Application Priority Data
Apr. 1, 2016 (JP) .............................. JP2016-074250

(51) Int. Cl.
*H04W 76/10* (2018.01)
*H04W 88/14* (2009.01)

(52) U.S. Cl.
CPC ........... *H04W 76/10* (2018.02); *H04W 88/14* (2013.01)

(58) Field of Classification Search
CPC .............................. H04W 76/10; H04W 88/14
See application file for complete search history.

(56) References Cited

U.S. PATENT DOCUMENTS

| 2009/0170426 | A1* | 7/2009 | Jung | H04W 8/24 455/7 |
| 2010/0113010 | A1* | 5/2010 | Tenny | H04L 47/10 455/423 |
| 2012/0063300 | A1 | 3/2012 | Sahin et al. | |
| 2012/0270574 | A1* | 10/2012 | Nishida | H04L 65/103 455/458 |
| 2015/0023153 | A1* | 1/2015 | Kashiwase | H04W 88/08 370/221 |
| 2017/0126618 | A1* | 5/2017 | Bhaskaran | H04L 61/2015 |

(Continued)

FOREIGN PATENT DOCUMENTS

EP    3 379 778 A1    9/2018

OTHER PUBLICATIONS

Extended European Search Report dated Dec. 7, 2018 in Patent Application No. 17774288.9, 12 pages.

(Continued)

*Primary Examiner* — Harry H Kim
(74) *Attorney, Agent, or Firm* — Oblon, McClelland, Maier & Neustadt, L.L.P.

(57) ABSTRACT

A connection control method is implemented by a communication system including a UE, two or more SGWs, and an MME for performing processing related to establishment and release of communication paths between the two or more SGWs and the UE. The connection control method includes a request reception in which the MME receives an establishment request of a communication path associated with the UE from one SGW, a path establishment starting processing related to establishment of communication paths between the UE and all SGWs, and an information updating in which the MME updates information related to an establishment status of the communication path stored in a storage unit on the basis of a result of establishing the communication path.

3 Claims, 22 Drawing Sheets

(56) References Cited

U.S. PATENT DOCUMENTS

| | | | |
|---|---|---|---|
| 2017/0215112 A1* | 7/2017 | Zheng | H04W 76/15 |
| 2017/0257906 A1* | 9/2017 | Gupta | H04W 36/0022 |
| 2018/0316522 A1 | 11/2018 | Chen et al. | |
| 2019/0021130 A1* | 1/2019 | Kim | H04W 76/20 |
| 2019/0149458 A1* | 5/2019 | Sahin | H04W 40/00 |
| | | | 370/218 |
| 2020/0169853 A1* | 5/2020 | Tamura | H04W 76/15 |

OTHER PUBLICATIONS

"Addition of End Marker Support for Handover Scenarios with SGW Relocation" NTT Docomo, 3GPP Draft; S2-132079_23401CR2558_END_MARKER-WAS_1769, 3rd Generation Partnership Project (3GPP), Mobile Competence Centre; 650, Route Des Lucioles; F-06921 Sophia-Antipolis Cedex; France, Retrieved from the Internet: URL:http://www.3gpp.org/ftp/tsg_sa/WG2_Arch/TSGS2_97_Busan/Docs/, vol. SA WG2, No. Busan, South Korea, XP050709258, May 31, 2013, 38 pages.

International Preliminary Report on Patentability and Written Opinion dated Oct. 11, 2018 in PCT/JP2017/010225 (with English translation), 6 pages.

International Search Report dated Apr. 18, 2017, in PCT/JP2017/010225 filed Mar. 14, 2017.

ETSI TS 123 401 V13.5.0, "LTE; General Packet Radio Services (GPRS) enhancements for Evolved Universal Terrestrial Radio Access Network (E-UTRAN) access (3GPP TS 23.401 version 13.5.0 Release 13", 2016, 338 pages.

* cited by examiner

*Fig.4*

| UE# | Status |
|---|---|
| #1 | IDLE |
| #2 | CONNECTED |
| #3 | IDLE |
| ..... | ..... |

Fig.10

| UE# | SGW# | Status |
|---|---|---|
| #1 | #1 | IDLE |
| #1 | #2 | CONNECTED |
| #2 | #1 | IDLE |
| #2 | #2 | IDLE |
| #3 | #1 | CONNECTED |
| #3 | #2 | IDLE |
| ..... | ..... | ..... |

CONNECTION CONTROL METHOD AND CONNECTION CONTROL DEVICE

TECHNICAL FIELD

The present invention relates to a connection control method and a connection control device.

BACKGROUND ART

Conventionally, technology for notifying a serving gateway (SGW) receiving a packet addressed to a user equipment (UE) of an idle status of a mobility management entity (MME) of packet reception and causing the UE to transition to a connected status by requesting bearer re-establishment is known (e.g., Non-Patent Literature 1).

CITATION LIST

Non-Patent Literature

[Non-Patent Literature 1] ETSI TS 123 401 V13.5.0

SUMMARY OF INVENTION

Technical Problem

In recent years, studies for implementing an environment in which a UE can be connected to a plurality of SGWs have been conducted. However, when a conventional method is applied to a connection environment with a plurality of SGWs, there is a possibility that inconsistency may occur in management of the connected status of a UE within a network. The occurrence of inconsistency in the management of the connected status of the UE within a network is considered to affect packet transmission and reception of the UE.

The present invention has been made in view of the above problems, and an objective of the present invention is to provide a connection control method and a connection control device capable of preventing inconsistency in management of a connected status of a UE from occurring in a network in which a plurality of communication control devices for controlling data transmission and reception of the UE are provided.

Solution to Problem

To achieve the above-described objective, a connection control method according to an aspect of the present invention is a connection control method implemented by a communication system including a UE, two or more communication control devices which are devices for controlling transmission and reception of data of the UE, and a connection control device for performing processing related to establishment and release of communication paths provided between the two or more communication control devices and the UE, the connection control method including: a request reception step in which the connection control device receives a path establishment request related to the communication path associated with the UE from one communication control device included in the two or more communication control devices; a path establishment step in which the connection control device starts processing related to establishment of communication paths associated with the UE for all communication control devices which are the two or more communication control devices including the one communication control device and for which the connection control device performs the processing related to the establishment and release of the communication path associated with the UE when the path establishment request is received; and an information update step in which the connection control device updates information related to an establishment status of the communication path associated with the UE stored in a storage unit on the basis of an establishment result of the communication path in the path establishment step.

Advantageous Effects of Invention

According to the present invention, there are provided a connection control method and a connection control device capable of preventing inconsistency in management of a connected status of a UE from occurring in a network in which a plurality of communication control devices for controlling transmission and reception of the UE are provided.

BRIEF DESCRIPTION OF DRAWINGS

FIG. 4 is a diagram illustrating an example of information stored in a path information storage unit of the MME.
FIG. 10 is a diagram illustrating an example of information stored in a path information storage unit of the MME.

DESCRIPTION OF EMBODIMENTS

Hereinafter, modes for carrying out the present invention will be described in detail with reference to the accompanying drawings. In description of the drawings, the same elements are denoted by the same reference signs and redundant description thereof will be omitted.

First Embodiment

Figure 1:
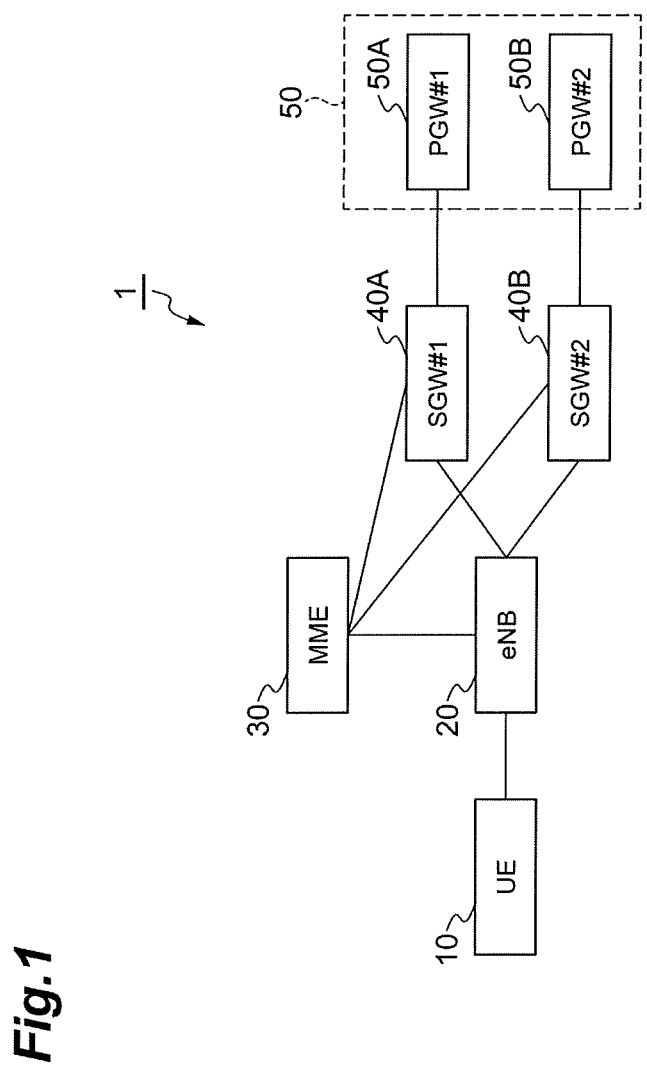
FIG. 1 is a diagram illustrating a system configuration of a communication system according to a first embodiment of the present invention.

FIG. 1 is a system configuration diagram of a communication system 1 according to an embodiment of the present invention. The communication system 1 is a communication system configured to provide data communication such as Voice over Long Term Evolution (LTE) (VoLTE) to a terminal device on the basis of a communication standard (a communication protocol) of an LTE network. The communication system 1 is configured to include an eNode B (eNB) 20, a mobility management entity (MIME) 30 (a connection control device), a first serving gateway (SGW) 40A (a communication control device), a second SGW 40B (a communication control device), a first packet data network gateway (PGW) 50A, and a second PGW 50B. A UE (UE) 10 implemented by a smartphone, a tablet terminal or the like can perform communication by establishing a communication connection with the communication system 1. In FIG. 1, the first SGW, the second SGW, the first PGW, and the second PGW are denoted by SGW #1, SGW #2, PGW #1, and PGW #2, respectively.

The eNB 20 is a wireless base station connected to the MME 30 and is a communication control device having a radio access control function. The eNB 20 has a reception control function when there is an outgoing signal from the UE 10 and a paging function for paging the UE 10 when there is an incoming signal from another UE 10 or the like to the UE 10 as basic functions.

The MME 30 is a part configured to perform a process of performing position management and authentication control of the UE 10 located in a network and setting up communication paths of user data between the first and second SGWs 40A and 40B and the eNB 20. The MME 30 stores information related to a process of setting up communication paths (bearers) between the UE 10 under the control of the eNB 20 and the first and second SGWs 40A and 40B (path information), and performs control related to establishment and release of bearers on the basis of the path information. In other words, the MME 30 functions as a connection control device in the present embodiment.

The first SGW 40A and the second SGW 40B transmit and receive user data to and from the first PGW 50A and the second PGW 50B, respectively. Also, the first SGW 40A and the second SGW 40B function as gateways (exchanges) connected to the UE 10 via the eNB 20 to transmit data to and from the UE 10. In other words, the first SGW 40A and the second SGW 40B function as communication control devices configured to control transmission and reception of data of the UE 10 in the present embodiment.

The first PGW 50A and the second PGW 50B can be connected to the first SGW 40A and the second SGW 40B, respectively, and function as gateways (exchanges) which are connection points associated with a packet network configured to provide communication services such as a voice service and an Internet connection service.

The communication system 1 is different from a conventional communication system in that two or more SGWs can be connected to one UE 10. In other words, the UE 10 can establish a bearer as a communication path with each of the first SGW 40A and the second SGW 40B via the eNB 20.

Also, although the first SGW 40A and the first PGW 50A are connected and the second SGW 40B and the second PGW 50B are connected in FIG. 1, this is an example of a connection. If there are a plurality of SGWs and a plurality of PGWs as in the communication system illustrated in FIG. 1, the SGW and the PGW are appropriately selected in accordance with a transmission destination of the packet, a service to be provided, or the like instead of there being a configuration in which a specific SGW and a specific PGW are connected. In the following embodiments, establishment (re-establishment) and release of bearers between the first and second SGWs 40A and 40B and the UE 10 will be described. For simplicity, basically the first PGW 50A and the second PGW 50B are collectively referred to as a PGW 50 in FIG. 2 and the drawings subsequent thereto.

Also, FIG. 1 illustrates a case in which two SGWs (the first SGW 40A and the second SGW 40B) can be connected to the UE 10 to show an example in which the UE 10 can be connected to two or more SGWs. However, the UE 10 may be able to be connected to three or more SGWs.

Next, the MME 30 corresponding to a connection control device which is a feature of the communication system 1 will be described with reference to FIG. 2.

Figure 2:
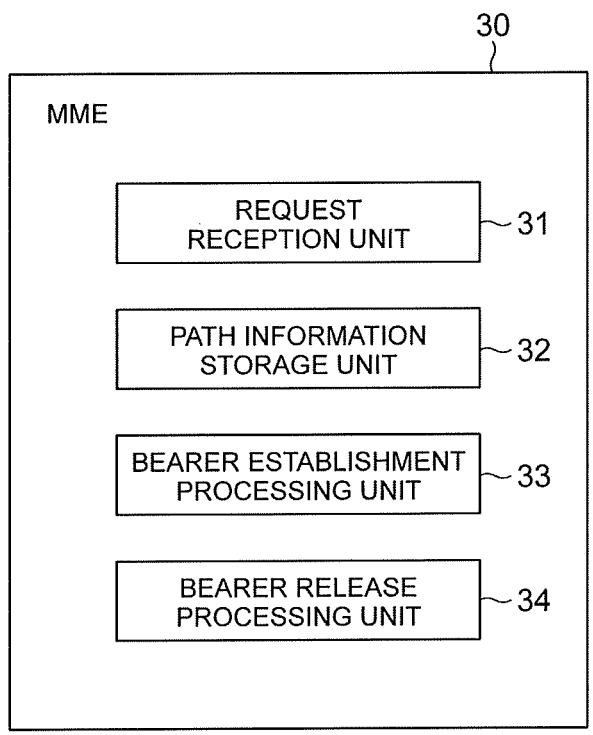
FIG. 2 is a diagram illustrating a function of an MME.

As illustrated in FIG. 2, the MME 30 is configured to include a request reception unit 31 (a request reception unit), a path information storage unit 32 (a storage unit), a bearer establishment processing unit 33 (a path establishment unit), and a bearer release processing unit 34 (a path release unit).

Figure 3:
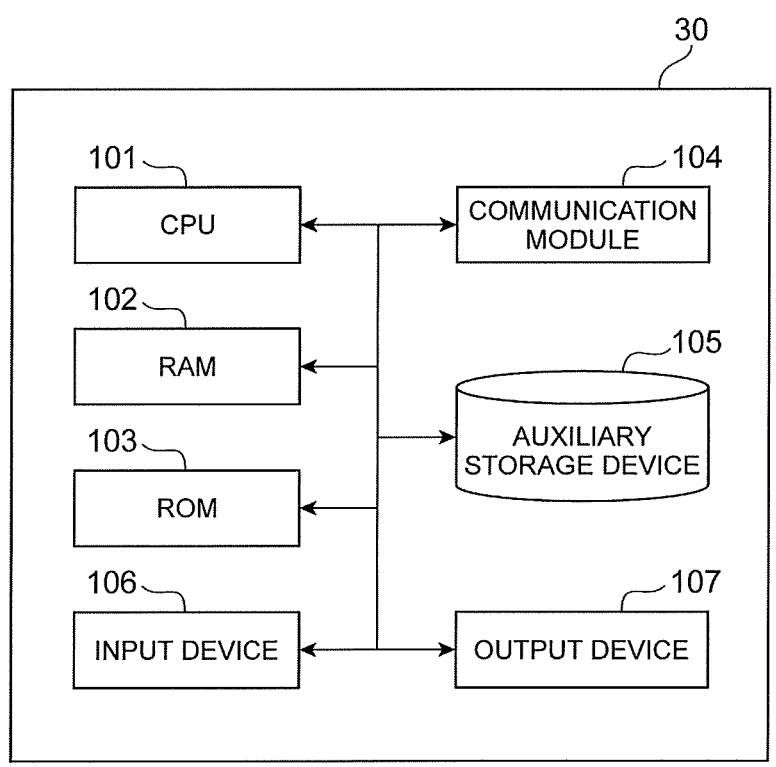
FIG. 3 is a diagram illustrating a hardware configuration of the MME.

As illustrated in FIG. 3, the MME 30 may be physically configured as a computer system including a central processing unit (CPU) 101, a random access memory (RAM) 102 serving as a main storage device, a read only memory (ROM) 103, a communication module 104 which is a data transmission/reception device, an auxiliary storage device 105 exemplified by a hard disk, a flash memory, or the like, an input device 106 exemplified by a touch panel, a keyboard, or the like which is an input device, an output device 107 such as a display, and the like. In the MME 30, the communication module 104, the input device 106, and the output device 107 are operated under the control of the CPU 101 by loading predetermined computer software on hardware such as the CPU 101 and the RAM 102 illustrated in FIG. 3, and a series of functions in the devices is implemented by reading and writing data in the RAM 102 and/or the auxiliary storage device 105. The block diagram illustrated in FIG. 2 illustrates blocks of functional units. These functional blocks (constituent units) are implemented by any combination of hardware and/or software. Means for implementing functional blocks are not particularly limited. In other words, each functional block may be implemented by a single device physically and/or logically coupled or implemented by a plurality of devices through direct and/or indirect connections between two or more devices physically and/or logically separated (in, for example, a wired and/or wireless type).

Also, the MME 30 may be configured to include hardware such as a microprocessor, a digital signal processor (DSP), an application specific integrated circuit (ASIC), a programmable logic device (PLD), and a field programmable gate array (FPGA) and some or all of the functional blocks may be implemented by the hardware. For example, a functional block may be installed in at least one piece of the hardware.

As illustrated in FIG. 2, the request reception unit 31 of the MME 30 is a part configured to receive a request related to establishment or release of a bearer from the eNB 20 or the first SGW 40A and the second SGW 40B. For example, when the first SGW 40A and the second SGW 40B receive packet data addressed to the UE 10 in a status in which no bearers are established between the first and second SGWs 40A and 40B and the UE, a request related to a bearer establishment process is transmitted from the first SGW 40A and the second SGW 40B to the MME 30. Also, "bearer establishment" includes re-establishment of the bearer once released. Also, when the bearer needs to be released, for example, due to a time-out or the like, in the status in which the bearer has already been established, the request related to the bearer establishment process is transmitted from the eNB 20 to the MME 30.

Figure 4:
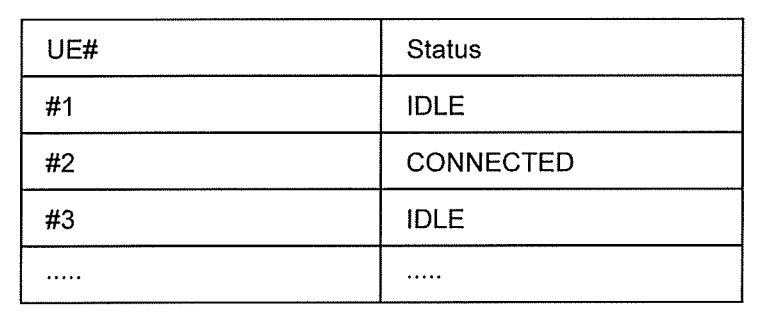

The path information storage unit 32 has a function of storing information indicating whether a bearer has been established for each UE 10. An example of information stored in the path information storage unit 32 is illustrated in FIG. 4. As illustrated in FIG. 4, information for identifying the UE 10 and a status related to the bearer of the UE 10 are associated and stored in the path information storage unit 32. For example, in FIG. 4, for the UE 10 identified by "#1," a status (information indicating a bearer establishment status) is "IDLE" which indicates that no bearer has been established. Also, in FIG. 4, for the UE 10 identified by "#2," the status is "CONNECTED" which indicates that a bearer is established. In the MME 30, information indicating an establishment status of the current bearer of the UE 10 stored in the path information storage unit 32 is updated and stored every time processing related to establishment and release of a bearer is performed. Information stored in the path information storage unit 32 may be used to check whether a process may be performed on the basis of the request when the request reception unit 31 receives a request related to the establishment or release of a bearer from the eNB 20 or the first SGW 40A and the second SGW 40B. For example, if the MME 30 stores a status in which a bearer of the UE 10 is established ("CONNECTED"), a possibility that a bearer establishment request will be an illegal request is conceivable when the bearer establishment request is received. Therefore, it is possible to notify a request source of an error without performing a process based on the request.

Also, the information stored in the path information storage unit 32 is updated according to establishment or release of a bearer. Therefore, the bearer establishment processing unit 33 and the bearer release processing unit 34 update the information stored in the path information storage unit 32.

The bearer establishment processing unit 33 has a function of performing control related to the establishment of a bearer when the request reception unit 31 receives a request related to the establishment of a bearer from the eNB 20 or the first SGW 40A and the second SGW 40B. Specifically, the bearer establishment processing unit 33 has a function of instructing the eNB 20 and the first SGW 40A or the second SGW 40B to start the bearer establishment process and providing information and the like necessary for the process. When the bearer is established under the control of the bearer establishment processing unit 33, the information stored in the path information storage unit 32 is updated on the basis of a bearer establishment result.

The bearer release processing unit 34 has a function of performing processing related to the release of a bearer if the request reception unit 31 receives a request related to the release of a bearer from the eNB 20 or the first SGW 40A and the second SGW 40B. Specifically, the bearer release processing unit 34 has a function of instructing the eNB 20 and the first SGW 40A or the second SGW 40B to start a bearer release process and providing information and the like necessary for the process. Also, when the bearer is released according to the control of the bearer release processing unit 34, the information stored in the path information storage unit 32 is updated on the basis of a bearer release result.

Here, before description of the connection control method performed by the MME 30 of the communication system 1 according to the present embodiment, a problem when a conventional connection control method is applied to the present system will be described with reference to FIG. 5. The conventional connection control method is a method when one UE 10 provides a bearer with one SGW. Although two or more SGWs can be connected to one UE 10 in the communication system according to the present embodiment, there is a possibility that a problem that information related to a bearer of the UE 10 stored in the MME 30 is inconsistent with an actual status will occur if the conventional method is applied in such a case.

Figure 5:
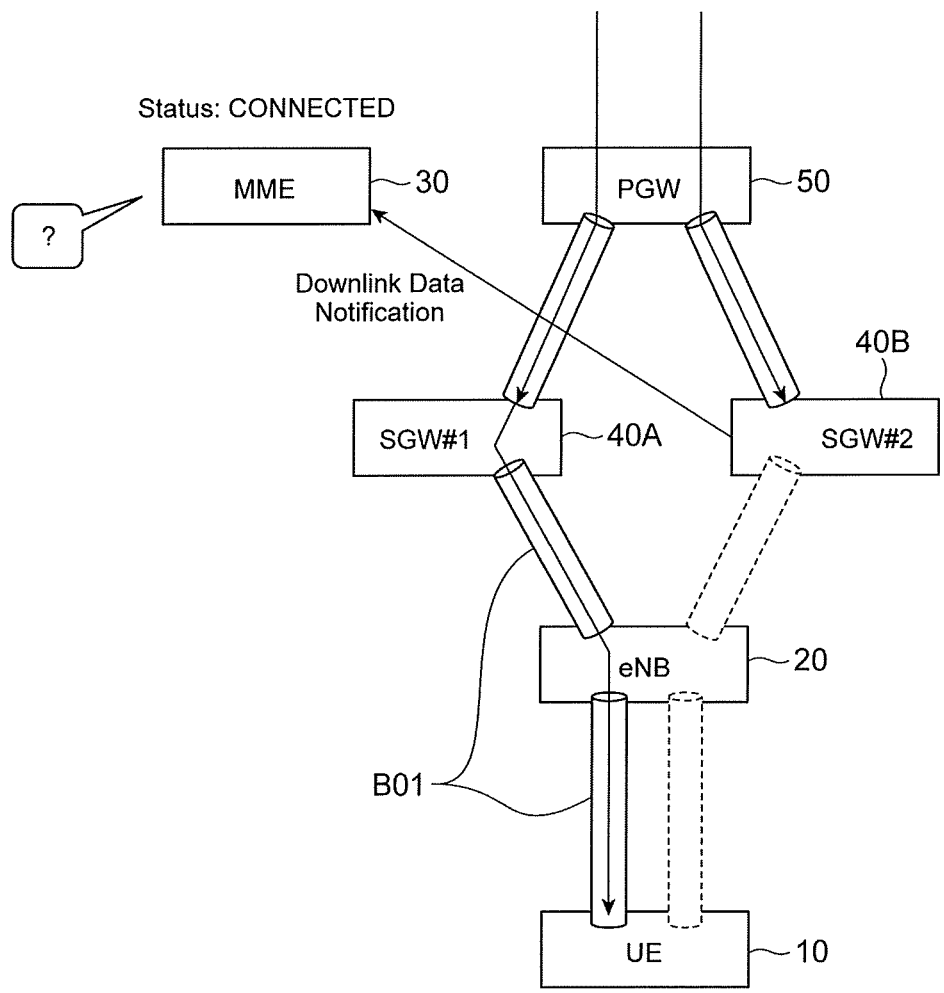
FIG. 5 is a diagram illustrating a problem of a connection control method in a conventional communication system.

In FIG. 5, a case in which the UE 10 is connectable to two SGWs (the first SGW 40A and the second SGW 40B) via the eNB 20 will be described. In FIG. 5, it is assumed that a bearer B01 is provided through the UE 10, the eNB 20, and the first SGW 40A as a premise. The bearer B01 is provided when the UE 10 previously transmits and receives packet data to and from a packet network. Because the bearer B01 is provided, a status of the bearer related to the UE 10 is "CONNECTED" in the path information storage unit 32 of the MME 30. Also, bearers provided between the first and second SGWs 40A and 40B and the PGW 50 are bearers provided when the UE 10 is attached (Attach) normally. The bearer is basically a bearer whose established status is maintained as long as a detachment (Detach) process is not executed due to power OFF of the UE 10 or the like.

Here, the PGW 50 is assumed to newly acquire packet data addressed to the UE 10 from the packet network. The PGW 50 determines a pass-through SGW on the basis of the information of the transmission source of the packet data addressed to the UE 10 by which the packet data is received and transfers the packet data to a corresponding SGW. Here, the PGW 50 is assumed to transfer the packet data to the second SGW 40B with reference to the information included in the packet data addressed to the UE 10. In the second SGW 40B, because no bearer is established with the UE 10 when the packet data addressed to the UE 10 from the PGW 50 is received, the second SGW 40B requests the MME 30 to establish a bearer (Downlink Data Notification). When the request related to the establishment of the bearer is received, the request reception unit 31 of the MME 30 starts processing related to establishment of a bearer after checking the establishment status of the bearer related to the UE 10 on the basis of the information stored in the path information storage unit 32 as described above.

However, as illustrated in FIG. 5, because the UE 10 has already established a bearer with the first SGW 40A, the MME 30 recognizes that the status of the bearer related to the UE 10 is "CONNECTED." In other words, the information stored in the path information storage unit 32 of the MME 30 is inconsistent with an actual status. Therefore, the MME 30 cannot perform the processing related to the establishment of the bearer based on a signal related to the bearer establishment request transmitted from the second SGW 40B, stops the process, and provides an error notification.

In this manner, when the conventional method is intended to be applied to an environment in which two or more SGWs can be connected to the UE 10, it is conceivable that inconsistency between the information stored in the MME 30 within the network and the status of the bearer provided between the UE 10 and the SGW may occur. If such a status occurs, it is conceivable that establishment and release of bearers between two or more SGWs and the UE 10 cannot be suitably performed and it may be difficult to suitably perform transmission of packet data from the packet network to the UE 10. Also, when the number of processes such as error notifications increases, it is conceivable that a problem related to a speed at which a network bandwidth is allocated to these processes may occur.

On the other hand, in the connection control method according to the present embodiment, control related to the establishment or release of a bearer to be performed by the MME 30 is different as compared with the conventional method. Thereby, even in a status in which the UE 10 can be connected to two or more SGWs, control is enabled such that inconsistency does not occur within a network with respect to an establishment status of a bearer related to the UE 10. In the present embodiment, three methods will be described as the connection control method to be performed by the MME 30.

(First Method: Re-Establishment of Plurality of Bearers)

As a first method, a method in which the MME 30 performs control so that bearers are provided between both the first SGW 40A and the second SGW 40B and the UE 10 when the MME 30 receives a request for establishing a bearer from the first SGW 40A or the second SGW 40B to the UE 10 is used.

Before description of a specific processing procedure, features of the first method will be described with reference to FIG. 6.

As a premise, it is assumed that no bearers are established both between the first SGW 40A and the UE 10 and between the second SGW 40B and the UE 10. Because no bearers are established, the status of the bearer related to the UE 10 is set to "IDLE" in the path information storage unit 32 of the MME 30. Here, the PGW 50 is assumed to newly acquire packet data addressed to the UE 10 from the packet network. The PGW 50 determines a pass-through SGW on the basis of information or the like of the transmission source of the packet data addressed to the UE 10 by which the packet data is received and transfers the packet data to a corresponding SGW. Here, the PGW 50 is assumed to transfer the packet data to the first SGW 40A with reference to the information included in the packet data addressed to the UE 10. In the first SGW 40A, because no bearer is established with the UE 10 when the packet data addressed to the UE 10 is received from the PGW 50, the first SGW 40A requests the MME 30 to establish a bearer (Downlink Data Notification). When the request related to the establishment of the bearer is received (a request reception step), the request reception unit 31 of the MME 30 starts processing related to establishment of a bearer after checking the establishment status of the bearer related to the UE 10 on the basis of the information stored in the path information storage unit 32 (a path establishment step). After it is checked that the bearer status of the UE 10 is "IDLE" in the MME 30, processing related to the establishment of the bearer is performed by the bearer establishment processing unit 33.

At this time, in the first method of the present embodiment, control related to the establishment of the bearer between the second SGW 40B, which has not received the packet data, and the UE 10 as well as control related to the establishment of the bearer between the first SGW 40A and the UE 10 is performed. Specifically, information for issuing an instruction of start of a bearer establishment process in which information for establishing bearers with the first SGW 40A and the second SGW 40B is included (Initial Context Setup Request) is transmitted to the eNB 20 configured to control the establishment of the bearer with the UE 10. Also, information for issuing an instruction of a start of a bearer establishment process (Modify Bearer Request) is transmitted to both the first SGW 40A and the second SGW 40B. As a result, a bearer B02 that passes through the first SGW 40A and a bearer B03 that passes through the second SGW 40B are established. Also, in the path information storage unit 32 of the MME 30, the status of the bearer related to the UE 10 is updated to "CONNECTED" (an information update step). Although only the first SGW 40A requesting the establishment of the bearer actually transmits the packet data addressed to the UE 10, it is possible to eliminate inconsistency between information related to the bearer establishment stored in the MME 30 within the network and the actual bearer establishment status between the UE 10 and the SGW by establishing the bearer related to the second SGW 40B.

Figure 7:
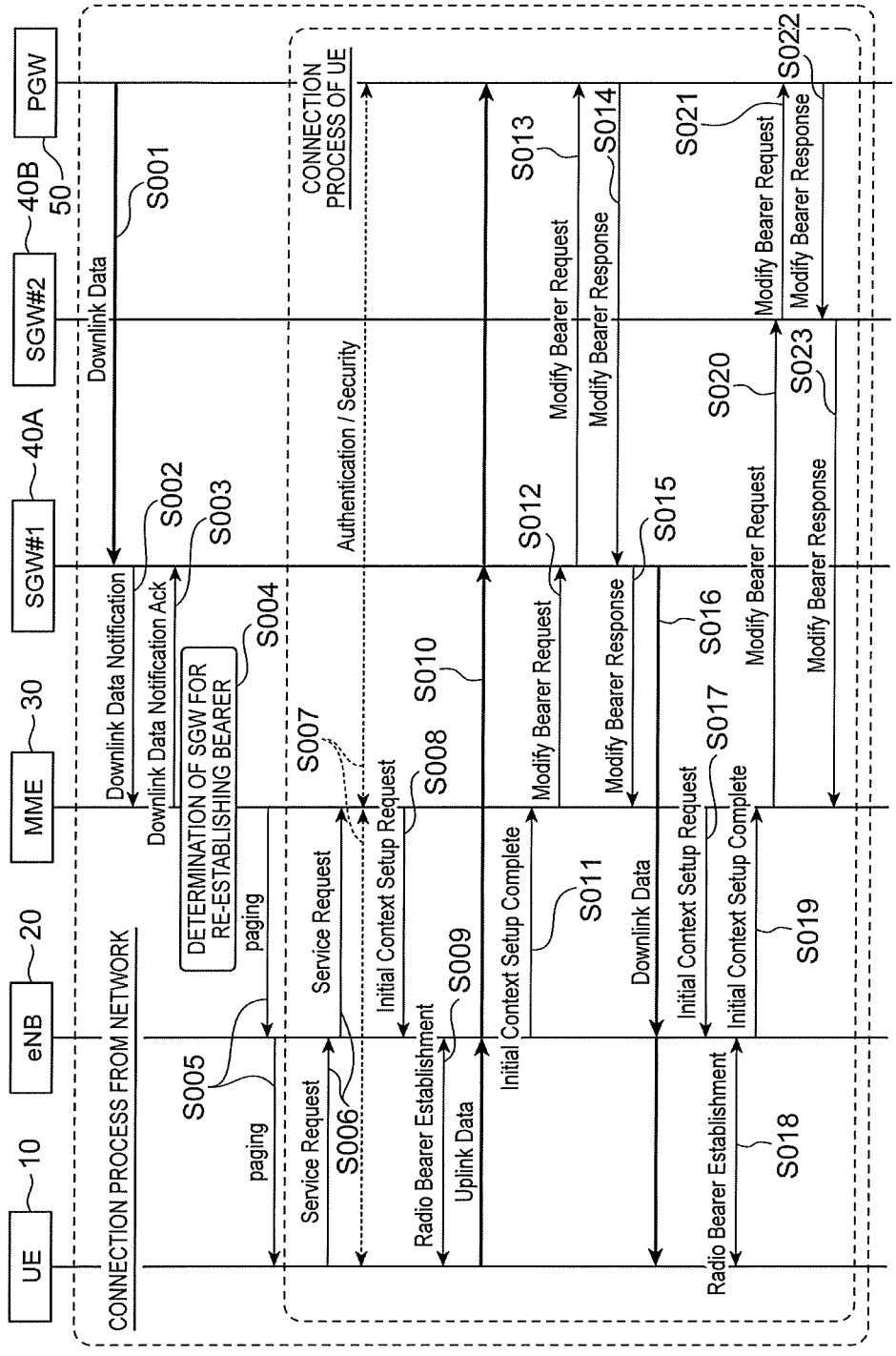
FIG. 7 is a sequence diagram illustrating the connection control method (the first method).
Figure 8:
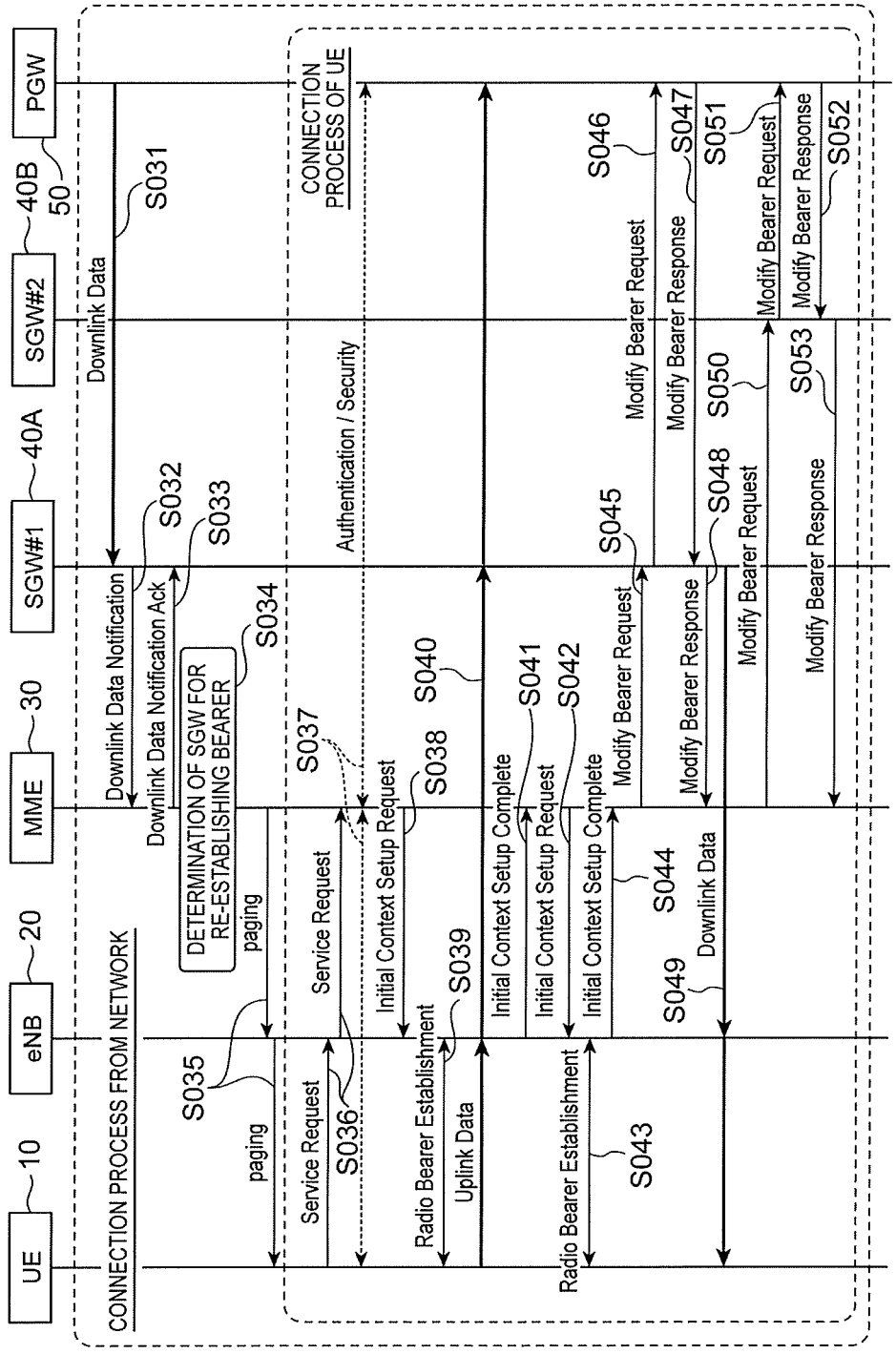
FIG. 8 is a sequence diagram illustrating a modified example of the connection control method (the first method).

A specific procedure will be described with reference to the sequence diagrams of FIGS. 7 and 8. In FIGS. 7 and 8, a processing order is partially different, but a process performed in the communication system 1 is the same.

First, description will be given with reference to FIG. 7. When the PGW 50 newly acquires packet data addressed to the UE 10 from the packet network, the PGW 50 transfers the packet data to an appropriate SGW with reference to the packet data (Downlink Data: S001). Here, an example in which the PGW 50 transfers the packet data to the first SGW 40A is shown. When the packet data addressed to the UE 10 is received, the first SGW 40A requests bearer establishment by notifying the MME 30 of reception of packet data addressed to the UE 10 (Downlink Data Notification: S002). When the request from the first SGW 40A is received (a request reception step), the request reception unit 31 of the MME 30 responds to the first SGW 40A (Downlink Data Notification Ack: S003) and determines whether a bearer may be established with the first SGW 40A (S004). Here, by referring to the information stored in the path information storage unit 32, it is checked whether a bearer may be established with the first SGW 40A in accordance with a request from the first SGW 40A.

When the MME 30 determines that the subsequent processing may be performed on the basis of the information stored in the path information storage unit 32, the bearer establishment processing unit 33 of the MME 30 continues the subsequent processing (a path establishment step). If the information stored in the path information storage unit 32 is not consistent with the request from the first SGW 40A and the subsequent processing cannot be performed, a configuration in which the process is stopped here and the first SGW 40A is notified of an error can be adopted. When the process is continued, the bearer establishment processing unit 33 of the MME 30 performs paging for the UE 10 via the eNB 20 (Paging: S005).

The UE 10 transmits a connection request (a bearer establishment request) to the MME 30 via the eNB 20 in correspondence with paging. When the MME 30 receives the bearer establishment request from the UE 10 (Service Request: S006), the MME 30 starts processing related to establishment of a bearer between the UE 10 and the first SGW 40A and establishment of a bearer between the UE 10 and the second SGW 40B.

First, the MME 30 performs authentication processes related to bearer establishment with the UE 10 and the PGW 50 (Authentication/Security: S007). Thereafter, by providing a notification of information for identifying the address of the first SGW 40A to the eNB 20, an instruction of bearer establishment with the first SGW 40A is issued (Initial Context Setup Request: S008). The eNB 20 notifies the UE 10 of the bearer establishment and performs processing related to the bearer establishment (Radio Bearer Establishment: S009). On the basis thereof, the UE 10 establishes a bearer for packet data to be transmitted from its own equipment and data transmission from the UE 10 to the first SGW 40A is enabled (Uplink Data: S010). After this processing is completed, the eNB 20 notifies the MME 30 that the processing related to the creation of the bearer of the UE 10 side has been completed (Initial Context Setup Complete: S011). When the MME 30 receives the notification from the eNB 20 side, a bearer between the UE 10 and the eNB 20 is established.

Next, the bearer establishment processing unit 33 of the MME 30 instructs the first SGW 40A to establish a bearer on an upstream side of the MME 30 (Modify Bearer Request: S012). On the basis of the instruction, the first SGW 40A performs a process of establishing a bearer and instructs the PGW 50 to perform setup related to the bearer reaching the UE 10 through the first SGW 40A (Modify Bearer Request: S013).

The PGW 50 performs a process of the setup related to the bearer, and notifies the first SGW 40A that the process has been completed when the process has been completed (Modify Bearer Response: S014). The first SGW 40A receiving such a notification notifies the MME 30 that the processing related to the bearer establishment of the upstream side has been completed (Modify Bearer Response: S015). Thereby, on a downstream side from the first SGW 40A, a bearer for transmitting packet data to the UE 10 is established, and data transmission from the first SGW 40A to the UE 10 is enabled (Downlink Data: S016). According to the above procedure, the bearer B02 that passes through the first SGW 40A (see FIG. 6) is established. Next, processing related to establishment of a bearer that passes through the second SGW 40B is started. This processing is substantially the same as the processing related to the establishment of the bearer B02. In other words, by notifying the eNB 20 of information for identifying the address of the second SGW 40B, an instruction of bearer establishment with the second SGW 40B is issued (Initial Context Setup Request: S017). Thereby, processing related to establishment of a bearer between the eNB 20 and the UE 10 is performed (Radio Bearer Establishment: S018). Thereby, a bearer for the packet data to be transmitted from the UE 10 is established, and the eNB 20 notifies the MME 30 that the processing related to the creation of the bearer of the UE 10 side has been completed (Initial Context Setup Complete: S019). When the MME 30 receives the notification from the eNB 20 side, a bearer between the UE 10 and the eNB 20 is established.

Next, the bearer establishment processing unit 33 of the MME 30 instructs the second SGW 40B to establish a bearer on an upstream side of the eNB 20 (Modify Bearer Request: S020). On the basis of this instruction, the second SGW 40B performs a process of establishing a bearer and instructs the PGW 50 to perform setup related to the bearer reaching the UE 10 through the second SGW 40B (Modify Bearer Request: S021).

The PGW 50 performs a process of the setup related to the bearer and notifies the second SGW 40B that the process has been completed when the process has been completed (Modify Bearer Response: S022). The second SGW 40B receiving this notification notifies the MME 30 that processing related to establishment of a bearer on the upstream side has been completed (Modify Bearer Response: S023). Thereby, on a downstream side from the second SGW 40B, a bearer for transmitting packet data to the UE 10 is established. According to the above procedure, the bearer B03 (see FIG. 6) that passes through the second SGW 40B is established. By receiving an establishment result, the MME 30 updates information indicating the establishment status of the bearer of the UE 10 in the path information storage unit 32 to "CONNECTED" and stores the updated information (an information update step). Then, the processing related to the bearer establishment performed by the bearer establishment processing unit 33 is completed.

Figure 6:
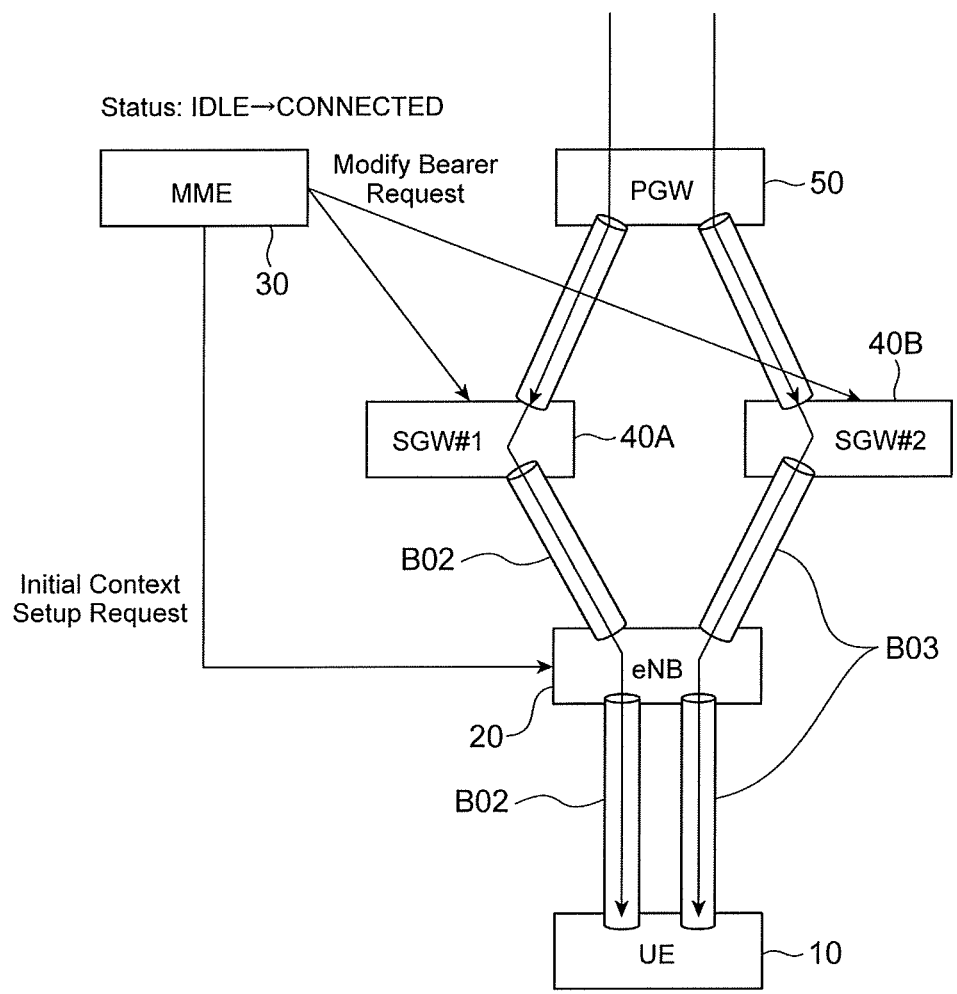
FIG. 6 is a diagram illustrating a first method of the connection control method according to the first embodiment.

According to the above process, if the first SGW 40A has received packet data, the bearer B02 that passes through the first SGW 40A and the bearer B03 that passes through the second SGW 40B are established as a bearer connecting the UE 10 and the PGW 50, as illustrated in FIG. 6. Also, in the MME 30, information indicating the establishment status of the bearer of the UE 10 becomes information consistent with the actual status, i.e., information indicating the status in which the bearer is established.

Therefore, communication via the first SGW 40A first receiving the packet data addressed to the UE 10 is enabled, the second SGW 40B does not need to transmit an establishment request for a new bearer to the MME 30 by receiving the packet data as a trigger even when the second SGW 40B receives the packet data addressed to the UE 10 in such a status, and communication related to the bearer establishment can be reduced. Also, by providing this configuration, even if the second SGW 40B is designed to transmit a request for establishing a new bearer to the MME 30, it is possible to instruct the second SGW 40B to perform transmission and reception of packet data by using the established bearer because information indicating the bearer establishment status stored in the MME 30 is consistent with an actual bearer establishment status. In other words, a status in which the information stored in the path information storage unit 32 of the MME 30 is consistent with the actual bearer establishment status between the first SGW 40A and the second SGW 40B is reached. Therefore, it is possible to prevent occurrence of an error according to inconsistency of information.

FIG. 8 has a different processing order in a part related to the connection process of the UE 10 as compared with the process illustrated in FIG. 7. In other words, when the pass-through SGW establishes two different bearers between the UE 10 and the PGW 50, the bearer B03 that passes through the second SGW 40B is created after the bearer B02 that passes through the first SGW 40A is created in the processing order illustrated in FIG. 7. On the other hand, in the processing order illustrated in FIG. 8, there is a characteristic that processes of establishing bearers on an upstream side of the MME 30 are performed after processes of establishing bearers on a downstream side of the MME 30 are completed at the same time among processes related to establishment of two bearers.

Specifically, when the PGW 50 newly acquires packet data addressed to the UE 10 from the packet network, the PGW 50 transfers the packet data to an appropriate SGW with reference to the packet data (Downlink Data: S031). On the other hand, when the packet data addressed to the UE 10 is received, the first SGW 40A requests bearer establishment by notifying the MME 30 of reception of the packet data addressed to the UE 10 (Downlink Data Notification: S032). When the request from the first SGW 40A is received (a request reception step), the request reception unit 31 of the MME 30 responds to the first SGW 40A (Downlink Data Notification Ack: S033) and determines whether a bearer may be established for the first SGW 40A (S034). If the subsequent processing is continued (it is determined to establish the bearer), the bearer establishment processing unit 33 of the MME 30 performs paging for the UE 10 via the eNB 20 (Paging: S035/a subsequent path establishment step). The process so far is the same as a series of processing steps (S001 to S005) in FIG. 7.

Next, the UE 10 transmits a connection request (a bearer establishment request) to the MME 30 via the eNB 20 in correspondence with paging. When the MME 30 receives the bearer establishment request from the UE 10 (Service Request: S036), the MME 30 starts processing related to the establishment of the bearer between the UE 10 and the first SGW 40A and the bearer between the UE 10 and the second SGW 40B.

First, the MME 30 performs authentication processes related to bearer establishment with the UE 10 and the PGW 50 (Authentication/Security: S037). Thereafter, by notifying the eNB 20 of information for identifying the address of the first SGW 40A, an instruction of beater establishment with the first SGW 40A is issued (Initial Context Setup Request: S038). The eNB 20 notifies the UE 10 of the bearer establishment and performs processing related to the bearer establishment (Radio Bearer Establishment: S039). On the basis thereof, the UE 10 establishes a bearer for packet data to be transmitted from its own equipment and data transmission from the UE 10 to the first SGW 40A is enabled (Uplink Data: S040). Thereafter, the eNB 20 notifies the MME 30 that the processing related to the creation of the bearer of the UE 10 side has been completed (Initial Context Setup Complete: S041). When the MME 30 receives the notification from the eNB 20 side, a bearer between the UE 10 and the eNB 20 is established. The process so far is also the same as the series of processing steps (S006 to S011) in FIG. 7.

Next, instead of the setup of a bearer on the upstream side (S012 to S016) in FIG. 7, the processing related to the establishment of the bearer that passes through the second SGW 40B associated with the UE 10 in FIG. 8 is first performed. In other words, by notifying the eNB 20 of information for identifying an address of the second SGW 40B, an instruction of bearer establishment with the second SGW 40B is issued (Initial Context Setup Request: S042). Thereby, the processing related to the establishment of the bearer between the eNB 20 and the UE 10 is performed (Radio Bearer Establishment: S043). Thereby, a bearer for packet data to be transmitted from the UE 10 is established, and the eNB 20 notifies the MME 30 that the processing related to the creation of the bearer of the UE 10 side has been completed (Initial Context Setup Complete: S044). When the MME 30 receives the notification from the eNB 20 side, a bearer between the UE 10 and the eNB 20 is established.

Thereafter, processing related to each of the bearer that passes through the first SGW 40A and the bearer that passes through the second SGW 40B is performed.

First, the bearer establishment processing unit 33 of the MME 30 instructs the first SGW 40A to establish a bearer on an upstream side of the eNB 20 (Modify Bearer Request: S045). On the basis of this instruction, the first SGW 40A performs a bearer establishment process and instructs the PGW 50 to perform setup related to the bearer reaching the UE 10 through the first SGW 40A (Modify Bearer Request: S046).

The PGW 50 performs a process of the setup related to the bearer and notifies the first SGW 40A that the process has been completed when the process has been completed (Modify Bearer Response: S047). When this notification is received, the first SGW 40A notifies the MME 30 that the processing related to the establishment of the bearer on the upstream side has been completed (Modify Bearer Response: S048). Thereby, on the downstream side from the first SGW 40A, a bearer for transmitting packet data to the UE 10 is established, and data transmission from the first SGW 40A to the UE 10 is enabled (Downlink Data: S049). According to the above procedure, the bearer B02 (see FIG. 6) that passes through the first SGW 40A is established.

Next, the bearer establishment processing unit 33 of the MME 30 instructs the second SGW 40B to establish a bearer on an upstream side of the MME 30 (Modify Bearer Request: S050). On the basis of this instruction, the second SGW 40B performs a bearer establishment process and instructs the PGW 50 to perform setup related to the bearer reaching the UE 10 through the second SGW 40B (Modify Bearer Request: S052). The PGW 50 performs a process of the setup related to the bearer and notifies the second SGW 40B that the process has been completed when the process has been completed (Modify Bearer Response: S052), and the second SGW 40B notifies the MME 30 that processing related to the establishment of the bearer on the upstream side has been completed (Modify Bearer Response: S053). Thereby, on the downstream side from the second SGW 40B, a bearer for transmitting packet data to the UE 10 is established. According to the above procedure, the bearer B03 (see FIG. 6) that passes through the second SGW 40B is established. By receiving an establishment result, the MME 30 updates information indicating the establishment status of the bearer of the UE 10 in the path information storage unit 32 to "CONNECTED" and stores the updated information (an information update step). Then, the processing related to the bearer establishment performed by the bearer establishment processing unit 33 is completed.

According to the above process, if the first SGW 40A receives packet data, the bearer B02 that passes through the first SGW 40A and the bearer B03 that passes through the second SGW 40B are established as a bearer connecting the UE 10 and the PGW 50 as illustrated in FIG. 6. In this manner, a process may be executed in the order illustrated in FIG. 8, and it is also possible to prevent inconsistency in management of the connected status (the bearer establishment status) of the UE 10 from occurring within the network in such a case.

In this manner, in the first connection control method, each bearer (communication path) associated with the UE 10 is established for all SGWs which are the two or more SGWs including a SGW transmitting a path establishment request and for which the MME 30 performs processing related to establishment and release of a bearer associated with the UE 10 on the basis of a path establishment request from one SGW included in two or more SGWs and information associated with a bearer establishment status for each UE 10 stored in the path information storage unit 32 of the MME 30 is updated on the basis of an establishment result.

Therefore, information stored in the path information storage unit 32 of the MME 30 is updated on the basis of establishment or release of bearers of some SGWs from two or more SGWs, so that it is possible to prevent inconsistency from occurring between information stored in the path information storage unit 32 and the bearer establishment status in the UE 10.

Also, although a case in which the first SGW 40A receives packet data has been described above with reference to FIGS. 7 and 8, a similar process can be performed even when the second SGW 40B receives packet data addressed to the UE 10. Also, even when the number of SGWs connectable to the UE 10 is three or more, it is possible to cope with such a case in a similar method as described above. In other words, the MME 30 issues a bearer establishment instruction to all SGWs including another SGW for controlling establishment and release of a bearer associated with the UE 10 as well as an SGW receiving the packet data addressed to the UE 10, thereby preventing inconstancy in management of a connected status (a bearer establishment status) of the UE 10 from occurring in a status in which there are two or more SGWs.

(Second Method: Management of Connected Status for Each SGW)

Next, as a second method, a method of storing a bearer establishment status for each UE 10 and each SGW instead of storing the bearer establishment status for each UE 10 in the path information storage unit 32 of the MME 30 is conventionally used.

Figure 9:
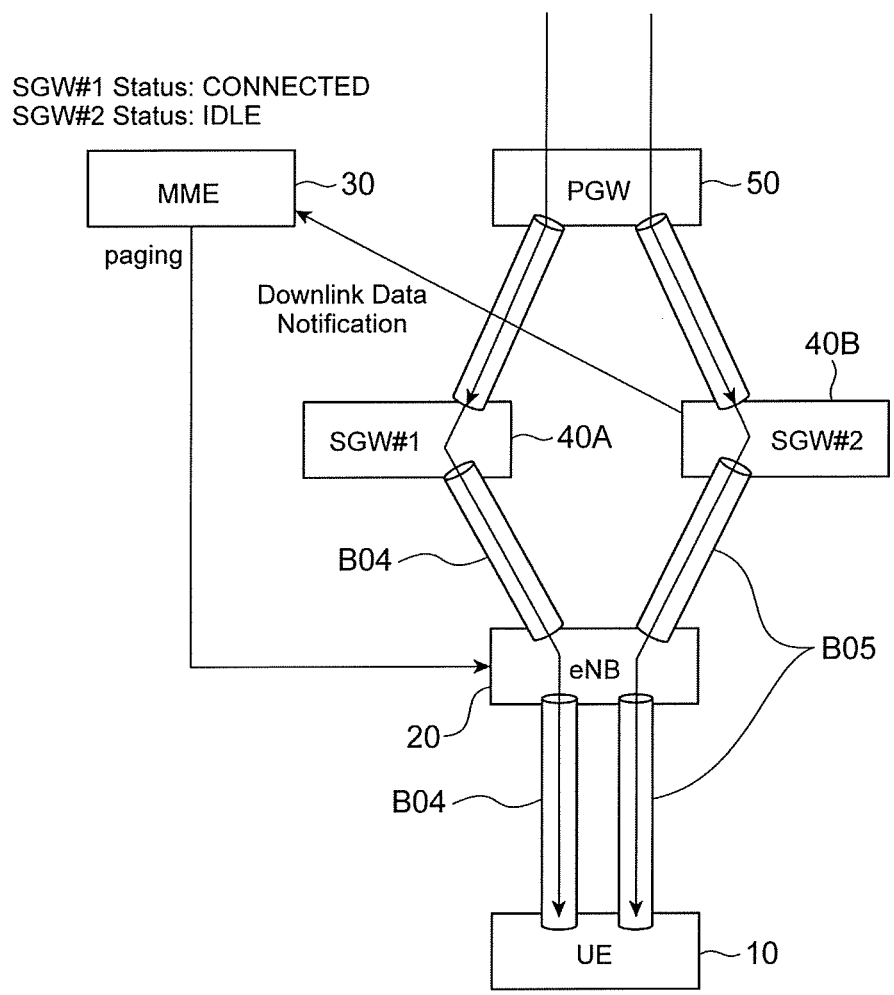
FIG. 9 is a diagram illustrating a second method of the connection control method according to the first embodiment.

Before description of the specific processing procedure, the features of the second method will be described with reference to FIG. 9.

It is assumed that a bearer B04 has already been established between the first SGW 40A and the UE 10 and no bearer has been established between the second SGW 40B and the UE 10 as a premise. In this case, in the path information storage unit 32 of the MME 30, the status of the bearer related to the UE 10 and the first SGW 40A is "CONNECTED" and the status of the bearer related to the UE 10 and the second SGW 40B is stored as "IDLE." Here, the PGW 50 is assumed to newly acquire packet data addressed to the UE 10 from the packet network. The PGW 50 determines the pass-through SGW on the basis of the information or the like of the transmission source of the packet data addressed to the UE 10 by which the packet data is received and transfers the packet data to a corresponding SGW. Here, the PGW 50 is assumed to transfer the packet data to the second SGW 40B with reference to the information included in the packet data addressed to the UE 10. In the second SGW 40B, because no bearer is established with the UE 10 when packet data addressed to the UE 10 is received from the PGW 50, the second SGW 40B requests the MME 30 to establish a bearer (Downlink Data Notification). The request reception unit 31 of the MME 30 starts processing related to establishment of a bearer after a bearer establishment status related to the UE 10 and the second SGW 40B is checked on the basis of information stored in the path information storage unit 32 (a path establishment step) when a request related to the bearer establishment is received (a request reception step).

Here, in the conventional method, because the bearer establishment status is stored for each UE 10, the information stored in the MME 30 is updated to "CONNECTED" when the bearer B04 between the first SGW 40A and the UE 10 is established. Therefore, inconsistency with the bearer establishment request from the second SGW 40B occurs and processing related to the establishment of a bearer between the second SGW 40B and the UE 10 cannot be performed.

On the other hand, in the second method of the present embodiment, the above-described inconsistency does not occur because the establishment status of the bearer associated with the UE 10 is stored for each SGW in the path information storage unit 32 of the MME 30. In other words, because information indicating that the bearer that passes through the second SGW 40B is in the "IDLE" status is stored in the path information storage unit 32 of the MME 30, the bearer establishment processing unit 33 of the MME 30 can perform processing related to the bearer establishment on the basis of a result thereof. Specifically, by performing paging for the eNB 20, it is possible to instruct the UE 10 to establish a bearer and to provide a bearer B05 passing through the second SGW 40B.

In this manner, it is possible to prevent inconsistency from occurring by storing a connected status (a bearer establishment status) associated with the UE 10 for each SGW in the path information storage unit of the MME 30.

An example of the information stored in the path information storage unit 32 of the MME 30 is illustrated in FIG. 10. As illustrated in FIG. 10, in the path information storage unit 32, information for identifying the UE 10, information for identifying the SGW to which the UE 10 can be connected, and a status related to the bearer passing through the SGW for the UE 10 are stored in association with each other. For example, in FIG. 10, for the UE 10 identified by "#1," the status related to the bearer that passes through the SGW identified by "#1" (information indicating the bearer establishment status) is set to "IDLE" which indicates that the bearer is not established. Also, in FIG. 10, for the UE 10 identified by "#1," the status related to the bearer that passes through the SGW identified by "#2" is set to "CONNECTED" which indicates a status in which the bearer is established. In this manner, in the second method, the bearer establishment status is managed for each pass-through SGW, i.e., for each different communication path, and control of the establishment and release of the bearer is performed on the basis thereof.

Figure 11:
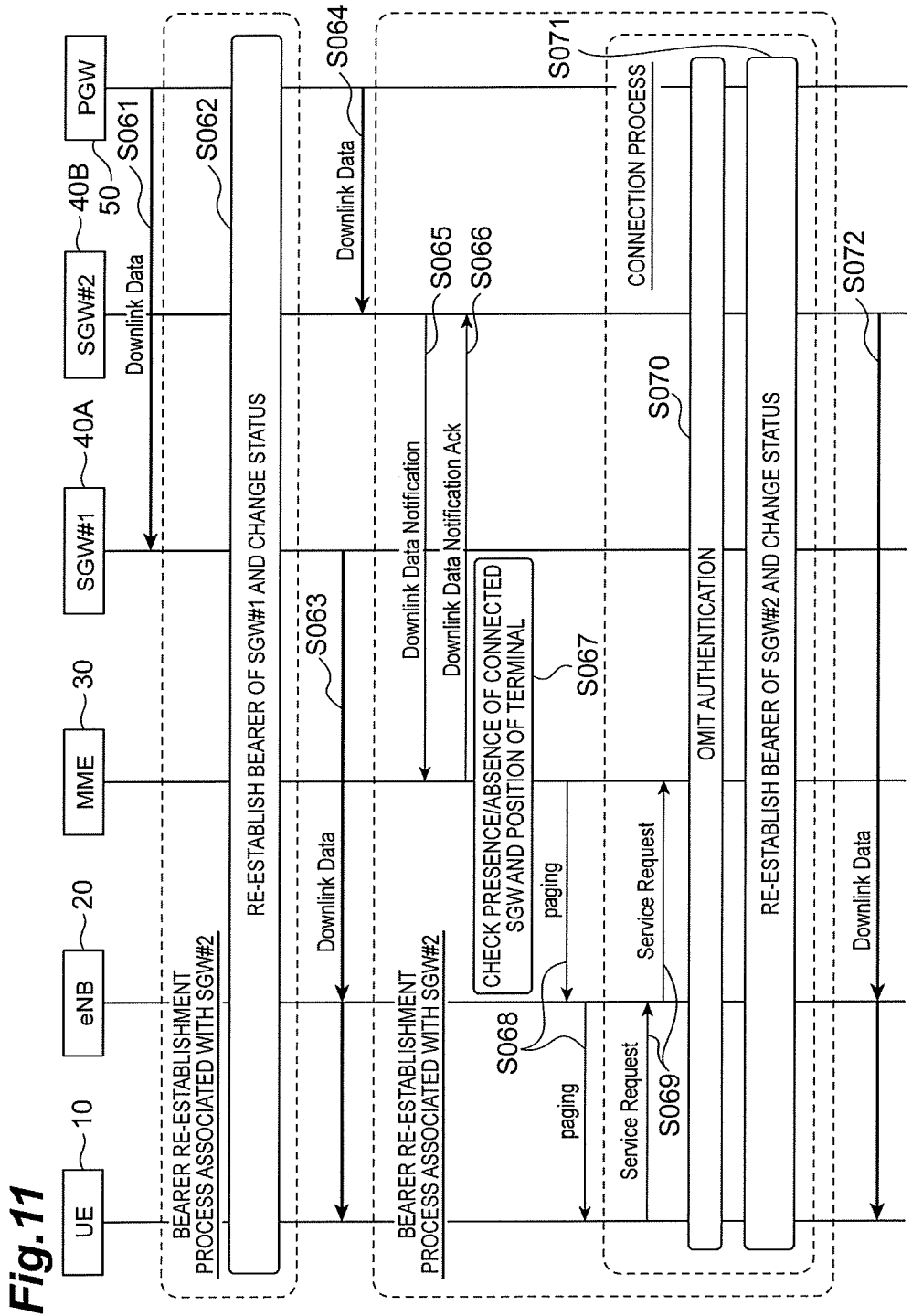
FIG. 11 is a sequence diagram illustrating the connection control method (the second method).
Figure 12:
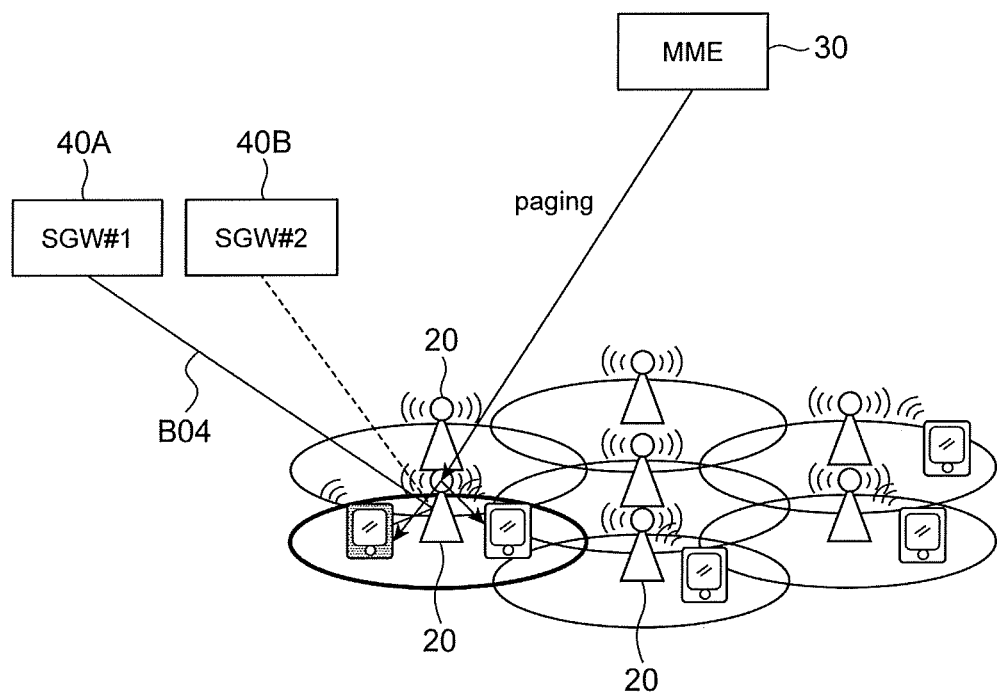
FIG. 12 is a diagram illustrating paging used in the second method.
Figure 13:
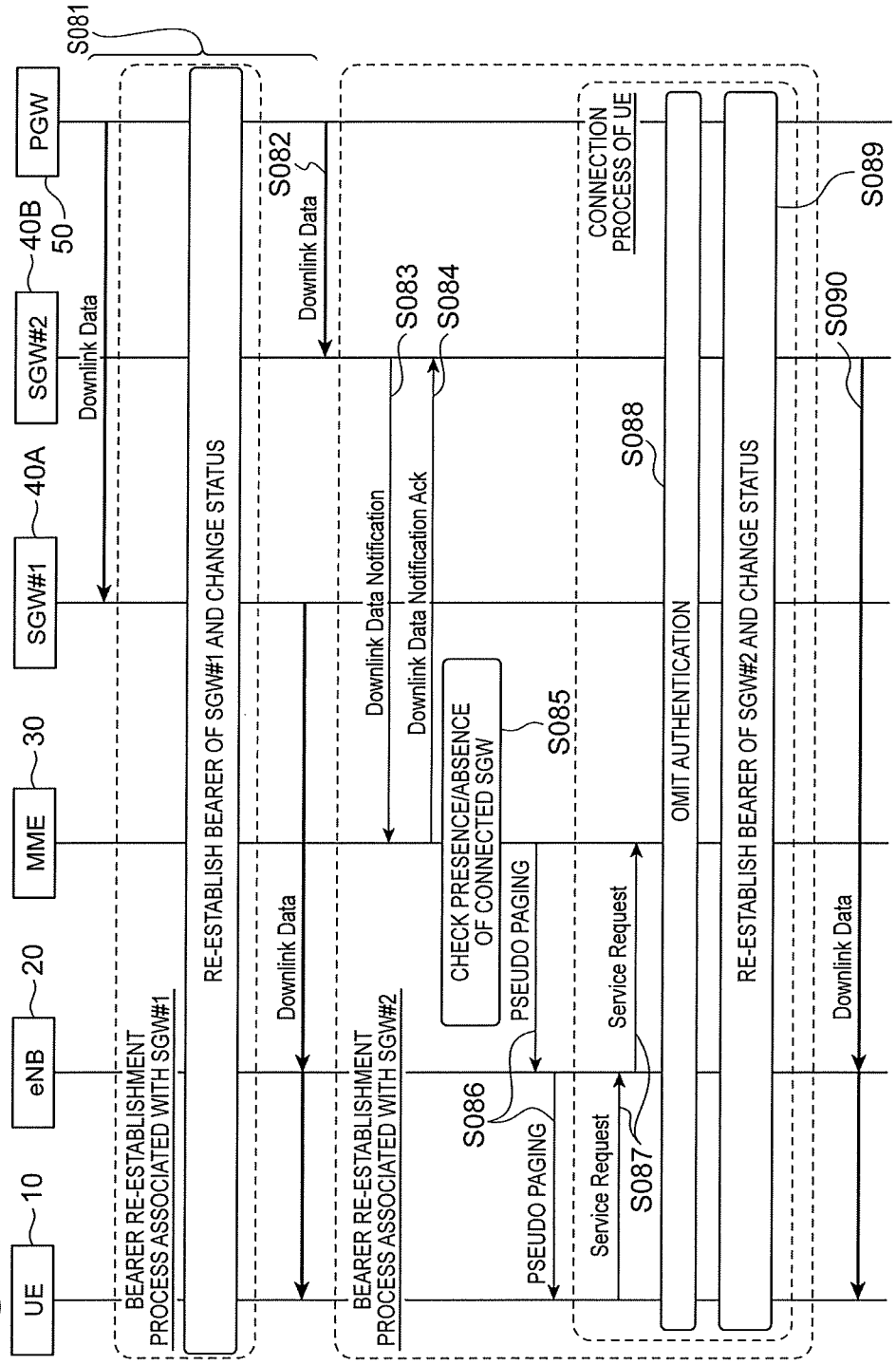
FIG. 13 is a sequence diagram illustrating a modified example of the connection control method (the second method).
Figure 14:
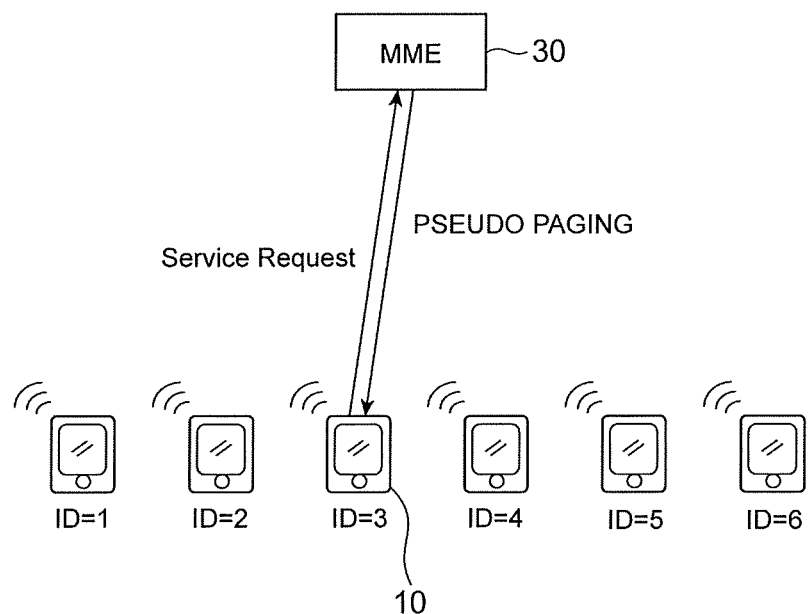
FIG. 14 is a diagram illustrating pseudo paging used in the second method.

A specific procedure will be described with reference to FIGS. 11 to 14. FIGS. 11 and 13 are sequence diagrams and FIGS. 12 and 14 are diagrams illustrating a part of processes included in FIGS. 11 and 13, respectively. The methods illustrated in FIGS. 11 and 12 are different from the methods illustrated in FIGS. 13 and 14 in a part of the process when the bearer of the second SGW 40B is established, but have the same basic flow.

First, description will be given with reference to FIG. 11. As a premise, it is assumed that both the bearer that passes through the first SGW 40A and the bearer that passes through the second SGW 40B are not established (are released). At this time, when the PGW 50 newly acquires packet data addressed to the UE 10 from the packet network, the PGW 50 transfers the packet data to an appropriate SGW with reference to the packet data (Downlink Data: S061). Here, an example in which the PGW 50 transfers to the first SGW 40A is shown. When the packet data addressed to the UE 10 is received, the first SGW 40A requests the MME 30 to establish a bearer. Thereby, a process of establishing a bearer via the first SGW 40A is executed (S062/a request reception step and a path establishment step). Details of the process of establishing the bearer are the same as those of the process illustrated in FIGS. 7 and 8 and the like and the authentication process, the bearer establishment process between the UE 10 and the eNB 20, and the bearer establishment process on the upstream side of the eNB 20 can be performed in this order. As a result, the bearer B04 that passes through the first SGW 40A is established and the establishment status of the bearer that passes through the first SGW 40A of the UE 10 is updated to "CONNECTED" in the path information storage unit 32 of the MME 30 (an information update step). Thereby, packet data can be transmitted from the first SGW 40A to the UE 10 (Downlink Data: S063).

Thereafter, in a status in which there is a bearer B04 that passes through the first SGW 40A, the PGW 50 is assumed to newly acquire packet data addressed to the UE 10 from the packet network and transfer the packet data to the second SGW 40BSGW with reference to the packet data (Downlink Data: S064).

The second SGW 40B requests bearer establishment by notifying the MME 30 of the reception of the packet data addressed to the UE 10 (Downlink Data Notification: S065). When a request from the second SGW 40B (a request reception step) is received, the request reception unit 31 of the MME 30 responds to the second SGW 40B (Downlink Data Notification Ack: S066), and checks the connected status and checks the position of the UE 10 (S067). Although only connected status check using the information stored in the path information storage unit 32 is performed in such a step in the case of the first method, it is possible to identify a cell in which the UE 10 is located on the MME 30 side in the case of the second method because the UE 10 has already established the bearer B04 that passes through the first SGW 40A. Therefore, after the cell in which the UE 10 is located is identified, identification information is used. If the subsequent processing is continued (it is determined to establish a bearer) as a result of checking the connected status, the bearer establishment processing unit 33 of the MME 30 performs paging for the UE 10 via the eNB 20 (Paging: S068/a subsequent path establishment step).

In the case of the method illustrated in FIG. 11, the UE 10 already has the bearer B04 that passes through the first SGW 40A, so that the MME 30 can acquire information related to the cell in which the UE 10 is located before paging. Thereby, it is possible to identify the cell to be paged. This point will be described with reference to FIG. 12.

When no bearer associated with the UE 10 serving as the destination of the packet data is provided, the eNB 20 to which the UE 10 is connected is not ascertained on the MME 30 side. Therefore, the MME 30 executes paging for the UE 10 via a plurality of eNBs 20 configured to perform connection control. On the other hand, when the bearer B04 that passes through the first SGW 40A is provided, the eNB 20 that passes through the bearer B04, i.e., the eNB 20 which is a base station of a cell in which the UE 10 is located, is identified. Therefore, it is possible to perform paging only under the eNB 20 to which the UE 10 is connected without performing paging for a plurality of cells. In this manner, it is possible to reduce an amount of communication related to paging for the UE 10 by adopting a configuration in which paging only for a specific cell is performed using the information used for establishing the first SGW 40A.

Returning to FIG. 11, the UE 10 transmits a connection request (a bearer establishment request) to the MME 30 via the eNB 20 in correspondence with paging. When the MME 30 receives a bearer establishment request from the UE 10 (Service Request: S069), the MME 30 starts processing related to establishment of a bearer between the UE 10 and the first SGW 40A and establishment of a bearer between the UE 10 and the second SGW 40B.

In the case of the second method, because the bearer B04 associated with the first SGW 40A has already been established, the authentication processing may be omitted (S070). Thereafter, a process of establishing a bearer is performed (S071). Details of the process of establishing the bearer are the same as those of the processes illustrated in FIGS. 7 and 8 and the like, and the bearer establishment process between the UE 10 and the eNB 20 and the bearer establishment process of the upstream side of the eNB 20 can be performed in this order. As a result, the bearer B05 that passes through the second SGW 40B is established, and the establishment status of the bearer that passes through the second SGW 40B of the UE 10 is updated to "CONNECTED" in the path information storage unit 32 of the MME 30 (an information update step). Thereby, packet data can be transmitted from the second SGW 40B to the UE 10 (Downlink Data: S072).

According to the above process, both the bearer B04 that passes through the first SGW 40A and the bearer B05 that passes through the second SGW 40B are established, so that packet data can be transmitted and received through either one of the bearers. Also, in the MME 30, information indicating the establishment status of the bearer related to the UE 10 can be changed to information consistent with the actual status, i.e., information indicating a status in which two bearers are established.

Therefore, even if the second SGW 40B receives the packet data addressed to the UE 10 in a status in which there is a bearer that passes through the first SGW 40A, it is possible to appropriately provide a bearer that passes through the second SGW 40B by receiving the packet data as a trigger.

FIG. 13 is different from the process illustrated in FIG. 11 in relation to a paging method when a bearer that passes through the second SGW 40B is established after the bearer B04 that passes through the first SGW 40A is established. However, the other processing is the same as the processing illustrated in FIG. 13.

First, processing related to the establishment of a bearer when the first SGW 40A receives the packet data addressed to the UE 10 (S081) is the same as the series of processing steps (S061 to S063) illustrated in FIG. 11.

Next, in a status in which there is the bearer B04 that passes through the first SGW 40A, the PGW 50 is assumed to newly acquire packet data addressed to the UE 10 from the packet network and transfer the packet data to the second SGW 40B with reference to the packet data (Downlink Data: S082).

The second SGW 40B requests the establishment of the bearer by notifying the MME 30 of the reception of the packet data addressed to the UE 10 (Downlink Data Notification: S083/a request reception step). The MME 30 responds to the request (Downlink Data Notification Ack: S084) and checks the connected status (S085). Although the cell in which the UE 10 is located is identified in the example illustrated in FIG. 11, only the connected status is checked in the example illustrated in FIG. 13. When the subsequent processing is continued (it is determined to establish a bearer) as a result of checking the connected status, the bearer establishment processing unit 33 of the MME 30 performs paging (pseudo paging) for the UE 10 via the eNB 20 (Pseudo Paging: S086/a subsequent path establishment step).

In the method illustrated in FIG. 13, pseudo paging is performed in a method different from normal paging, and the UE 10 is requested to start a connection process. Specifically, as illustrated in FIG. 14, pseudo paging information corresponding to paging is transmitted to only a specific UE 10 (here, a UE identified as ID=3) required to establish a bearer so that paging information does not reach other UEs.

In the pseudo paging information, the bearer B04 that passes through the first SGW 40A is already used. In other words, an instruction for transmitting the pseudo paging information is transmitted to the eNB 20 for which the bearer B04 associated with the UE 10 is provided via a control bearer used when the bearer B04 provided between the eNB 20 and the UE 10 is established. Thereby, pseudo paging corresponding to paging can be performed only for the destination UE 10. Also, the destination UE 10 can also perform subsequent processing by responding to the pseudo paging information. Furthermore, if the pseudo paging is configured to be performed as described above, it is possible to reduce an amount of communication related to paging for the UE 10.

Returning to FIG. 13, the UE 10 transmits a connection request (a bearer establishment request) to the MME 30 via the eNB 20 in correspondence with the pseudo paging. When the MME 30 receives the bearer establishment request from the UE 10 (Service Request: S087), the MME 30 starts processing related to the establishment of the bearer between the UE 10 and the first SGW 40A and the establishment of the bearer between the UE 10 and the second SGW 40B.

Thereafter, as in FIG. 11, the authentication process may be omitted (S088), and then a series of processing steps for establishing a bearer is performed (S089). As a result, the bearer B05 that passes through the second SGW 40B is established, and the establishment status of the bearer that passes through the second SGW 40B of the UE 10 is updated to "CONNECTED" in the path information storage unit 32 of the MME 30 (an information update step). Thereby, packet data can be transmitted from the second SGW 40B to the UE 10 (Downlink Data: S090).

In this manner, both the bearer B04 that passes through the first SGW 40A and the bearer B05 that passes through the second SGW 40B are also established in the method illustrated in FIG. 13, so that packet data can be transmitted and received through either one of the bearers. Also, in the MME 30, information indicating the establishment status of the bearer related to the UE 10 can be changed to information consistent with the actual status, i.e., information indicating a status in which two bearers are established.

In this manner, according to the second connection control method, when a path establishment request is received from one SGW included in two or more SGWs and a bearer associated with one SGW is established, information related to the establishment status of the bearer between one SGW and the UE 10 stored in the path information storage unit 32 is updated on the basis of an establishment result thereof. Therefore, even if processing related to establishment or release of a communication path is performed in some SGWs included in two or more SGWs, it is possible to prevent inconsistency from occurring between the information stored in the path information storage unit 32 of the MME 30 and the establishment status of the communication path in the UE 10.

Although a case in which two SGWs receive packet data addressed to the UE 10 has been described above with reference to FIGS. 11 to 14, it is possible to cope therewith in a method similar to the above even when the number of SGWs to which the UE 10 can be connected is three or more. In other words, by updating the information stored in the path information storage unit 32 of the MME 30 in correspondence with the number of SGWs, it is possible to prevent inconsistency in management of the connected status (the bearer establishment status) of the UE 10 from occurring in a status in which there are two or more SGWs.

Also, although an example in which paging is performed only for a specific cell (S068) or pseudo paging is performed for the UE 10 (S086) as a method of paging (S068 and S086) is illustrated in FIGS. 11 and 13, a conventional paging method may be used.

(Third Method: Unification of Bearers)

Next, when an established bearer is released after the bearer is established and transmission and reception of packet data are performed as a third method, a conventional method is a method of fixing a bearer for transmitting packet data from the PGW 50 by leaving one bearer and releasing the other bearer from bearers regularly provided between the PGW 50 and two or more SGWs.

Figure 15:
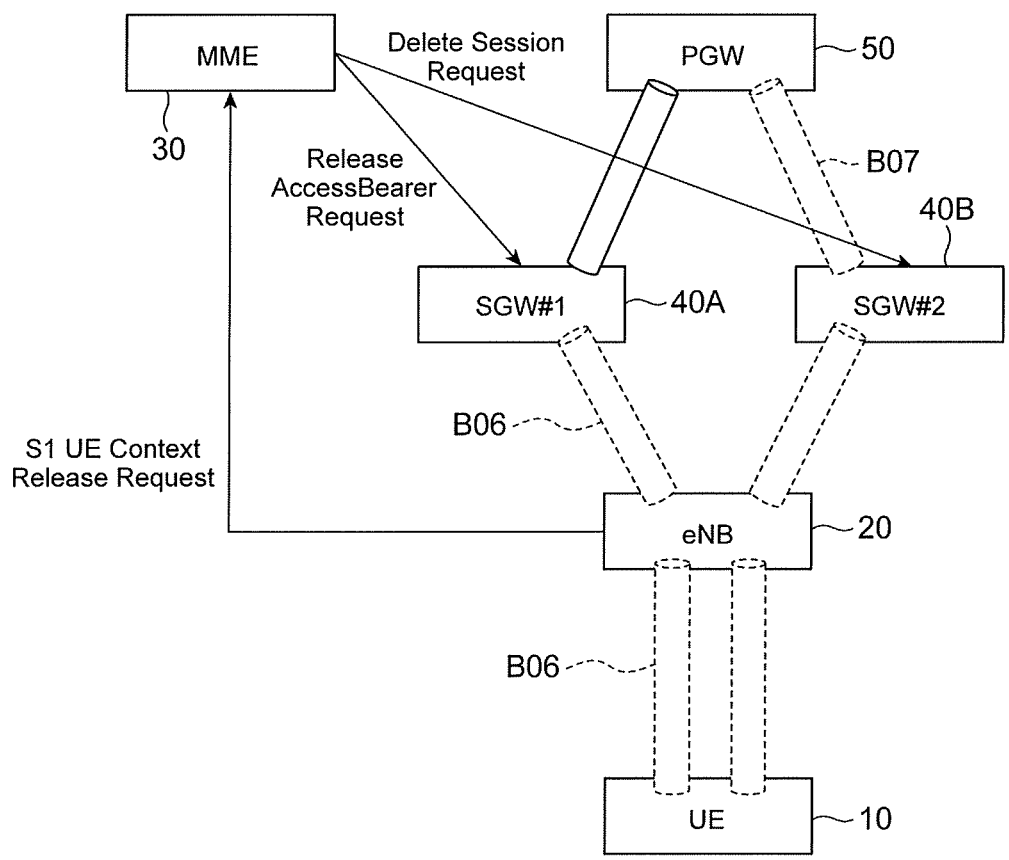
FIG. 15 is a diagram illustrating a third method of the connection control method according to the first embodiment.

Before description of a specific processing procedure, features of the third method will be described with reference to FIG. 15.

It is assumed that a bearer B06 has already been established between the first SGW 40A and the UE 10 and no bearer has been established between the second SGW 40B and the UE 10 as a premise. In this case, a bearer B07 provided in a service area is also regularly provided between the PGW 50 and the second SGW 40B. Here, the bearer B06 that passes through the first SGW 40A is assumed to be released due to time-out or the like. In the conventional method, the eNB 20 requests the MME 30 to release the bearer (S1 UE Context Release Request). When this request is received in the request reception unit 31 of the MME 30, the bearer release processing unit 34 of the MME 30 requests the first SGW 40A to release the bearer B06 (Release Access Bearer Request). On the basis thereof, the first SGW 40A releases the bearer B06 on the downstream side of the first SGW 40A and the process is completed.

On the other hand, in the third method, in addition to release of the bearer B06 that passes through the first SGW 40A, the bearer release processing unit 34 of the MME 30 requests the second SGW 40B to delete a packet data network (PDN) connection itself between the UE 10 and the PGW 50 (Delete Session Request). Because the request related to the deletion of the PDN connection also includes a request for releasing the bearer B07 between the second SGW 40B and the PGW 50 on a side above the second SGW 40B, the second SGW 40B releases the bearer B07 on the basis of the request. As a result, the SGW to which the PGW 50 can transmit packet data is only the first SGW 40A for which there is a bearer, and the number of SGWs which are transmission destinations of packet data is limited to one. Therefore, the bearer establishment status stored in the path information storage unit 32 of the MME 30 indicates information related to one SGW (the first SGW 40A in FIG. 15) serving as the transmission destination of the packet data from the PGW 50, and it is possible to create a status in which inconsistency between the information stored in the MME 30 and the status of the bearer provided between the UE 10 and the SGW (the first SGW 40A) does not occur.

Also, according to the method, there is a possibility that transmission may not be able to be appropriately performed when there is packet data to be transmitted to the UE 10 through the second SGW 40B. Therefore, when the third method is used, it is preferable to additionally provide a process of re-establishing the bearer B07 between the second SGW 40B and the PGW 50 as necessary. In such a method, for example, if it is checked that the PGW 50 has received the packet data to pass through the second SGW 40B, it is conceivable to provide a notification of an error and report the error to the MME 30. In addition, it is conceivable to use a method of making a change to a configuration in which packet data is transmitted through the first SGW 40A even when the PGW 50 receives packet data to pass through another SGW in a step in which the bearer B07 is released or the like.

A specific procedure will be described with reference to the sequence diagram of FIG. 16. As a premise, it is assumed that a bearer B06 that passes through the first SGW 40A in association with the UE 10 is established and a bearer that passes through the second SGW 40B in association with the UE 10 is not established. Also, the bearer B07 between the second SGW 40B and the PGW 50 is established.

At this time, if the eNB 20 determines that it is necessary to release the bearer B06, the UE 10 is notified of the release of the bearer B06 (RRC Connection Release: S101) and a request for releasing the bearer B06 is transmitted to the MME 30 (S1 UE Context Release Request: S102). When the request is received from the eNB 20, the request reception unit 31 of the MME 30 continues the processing related to the release of the bearer B06 after checking information stored in the path information storage unit 32. The bearer release processing unit 34 of the MME 30 transmits a request related to release of the bearer B06 to the first SGW 40A (Release Access Bearer Request: S103). On the other hand, after the processing related to the release of the bearer B06 is performed in the first SGW 40A on the basis of the request, a processing result is transmitted to the MME 30 (Release Access Bearer Response: S104).

Next, the bearer release processing unit 34 of the MME 30 performs a process of releasing a PDN connection to another SGW for which no bearer is provided. In the case of the present embodiment, a request for processing related to release of the PDN connection is transmitted to the second SGW 40B (Delete Session Request: S105). On the basis of the request, the second SGW 40B performs processing related to the release of the bearer with the PGW 50 (Delete Session Request: S106 and Delete Session Response: S107) and transmits a processing result to the MME 30 (Delete Session Response: S108). Further, the MME 30 also performs processing related to release of the PDN connection to the eNB 20 and the UE 10 on the downstream side (S109). Because a series of information to be transmitted and received for the PDN connection illustrated in FIG. 16 is information conventionally used for releasing the PDN connection, detailed description thereof will be omitted. The PDN connection on the second SGW 40B side is released by performing the above-described process.

Thereafter, the eNB 20 is notified that a series of processing steps related to the release of the bearer B06 have been completed in correspondence with the release request of the bearer B06 (S1 UE Context Release Request: S102) for the MME 30 (S1 UE Context Release Command: S110). The eNB 20 responds to the notification from the MME 30 (S1 UE Context Release Complete: S111), thereby completing the series of processing steps. Also, the MME 30 updates the establishment status of the bearer related to the UE 10 in the path information storage unit 32 to "IDLE."

Figure 16:
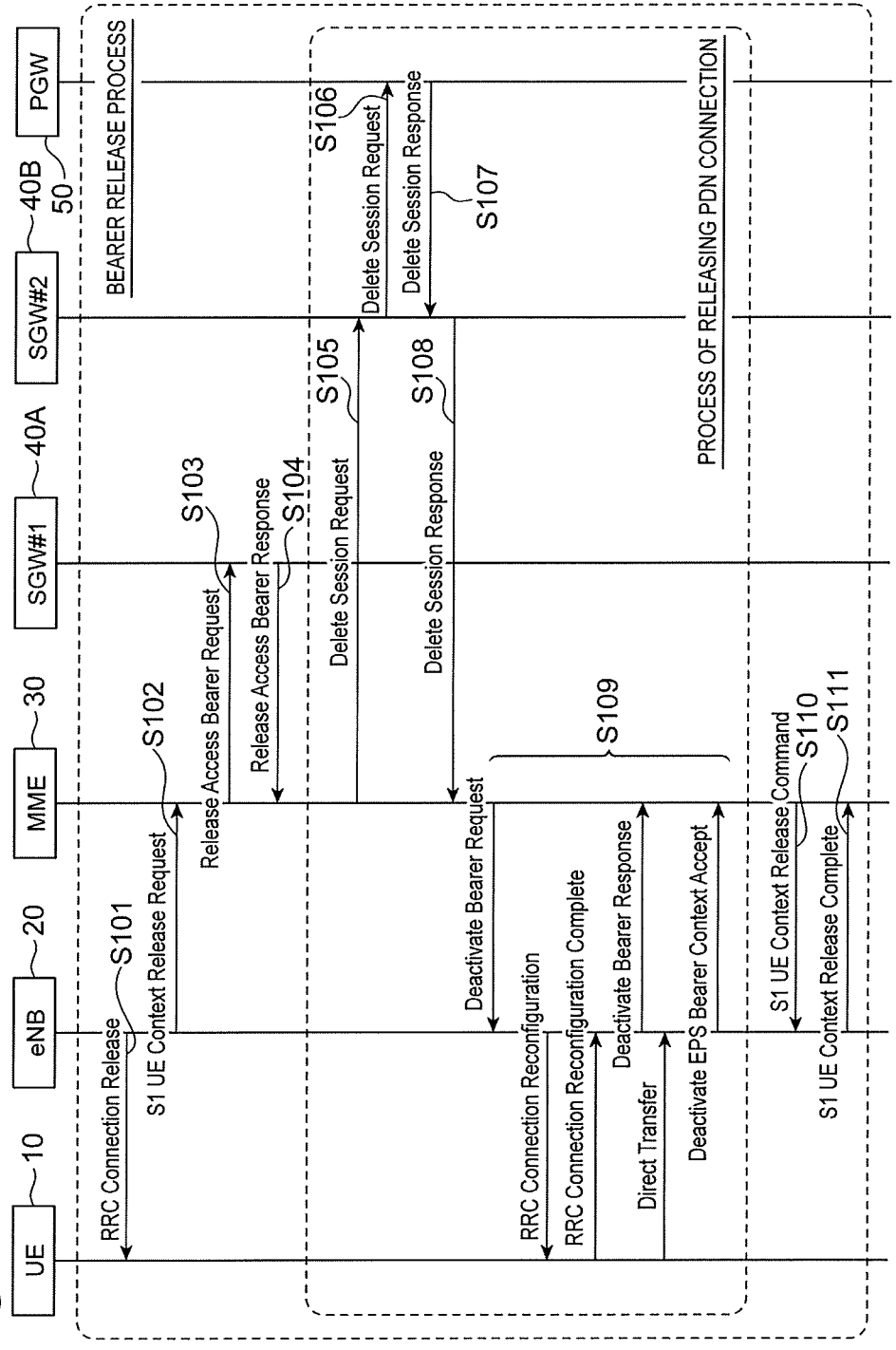
FIG. 16 is a sequence diagram illustrating the connection control method (the third method).

By performing the above-described process illustrated in FIG. 16, it becomes possible to transmit and receive packet data by providing a bearer that only passes through the UE 10, the first SGW 40A, and the PGW 50. Also, because information related to the bearer establishment status stored for each UE 10 in the path information storage unit 32 of the MME 30 becomes information corresponding to the establishment status of the bearer that passes through the first SGW 40A, control in which inconsistency does not occur within the network is implemented for the establishment status of the bearer related to the UE 10. However, the present method is different from the first method and the second method in that it is necessary to re-establish the PDN connection for a status in which the second SGW 40B can be used.

Also, although a case in which the number of SGWs connectable to the UE 10 is two has been described above with reference to FIG. 16, it is possible to cope therewith in a similar method as described above even when the number of SGWs to which the UE 10 can be connected is three or more. In other words, control in which inconsistency does not occur within a network for a bearer establishment status related to the UE 10 is implemented by setting the number of SGWs having a status in which packet data can be transmitted and received by providing a bearer to one and releasing the PDN connection for another SGW.

Second Embodiment

Next, a second embodiment of the present invention will be described. In the second embodiment, a configuration when a PGW and a SGW perform C/U separation will be described. The C/U separation is technology for separating and processing a control signal (Control-Plane signal: C-Plane) to be processed in communication and a signal (User-Plane signal: U-Plane) related to a user's data. When the C/U separation is applied, the PGW and the SGW can be separated into XGW-C for processing C-Plane and XGW-U for processing U-Plane, respectively. A connection control method according to the present invention can also be used under a status in which C/U separation is applied. Although C-Plane and U-Plane are described without being distinguished in the above-described embodiment, a signal to be processed by XGW-C and a signal to be processed by XGW-U are distinguished under the C/U separation status. Then, a signal for connecting XGW-C and XGW-U is newly provided as necessary.

Figure 17:
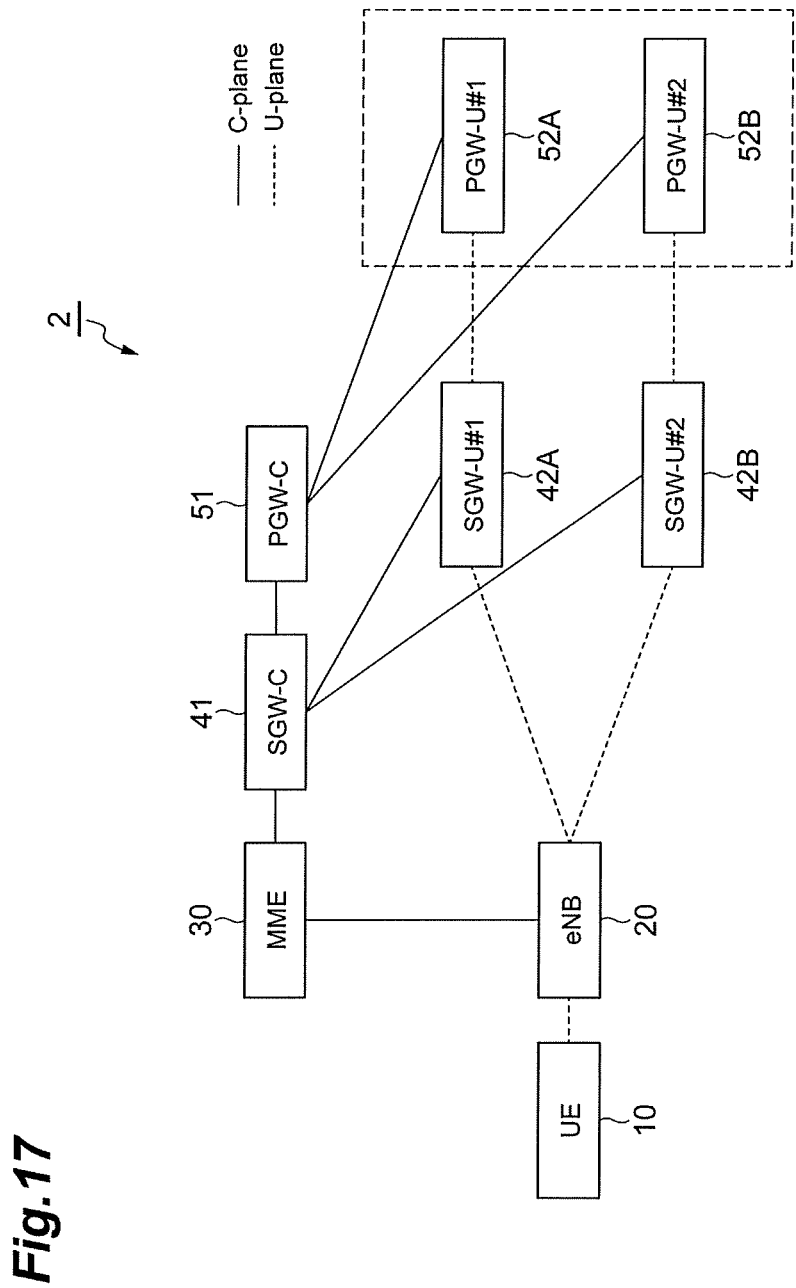
FIG. 17 is a diagram illustrating a system configuration of a communication system according to a second embodiment of the present invention.

FIG. 17 is a system configuration diagram of a communication system 2 according to the second embodiment of the present invention. The communication system 2 is different from the communication system 1 in that an SGW-C 41, a first SGW-U 42A, and a second SGW-U 42B are provided in place of the first SGW 40A and the second SGW 40B. Similarly, the communication system 2 is different from the communication system 1 in relation to PGWs in that a PGW-C 51, a first PGW-U 52A, and a second PGW-U 52B are provided in place of the first PGW 50A and the second PGW 50B. In the drawings, a first SGW-U, a second SGW-U, a first PGW-U, and a second PGW-U are illustrated as SGW-U#1, SGW-U#2, PGW-U#1, and PGW-U#1, respectively.

If a plurality of PGWs and a plurality of SGWs are provided under the status of C/U separation, a configuration in which the number of devices for processing C-Plane is one and the number of devices for processing U-Plane is two or more is adopted as illustrated in FIG. 17. A bearer for transmitting and receiving packet data from the UE 10 is provided through a device for processing U-Plane, i.e., the first SGW-U 42A and the second SGW-U 42B.

Also, in FIG. 17, as in FIG. 1, the first SGW-U 42A and the first PGW-U 52A are connected and the second SGW-U 42B and the second PGW-U 52B are connected. However, this is only an example of a connection. In other words, a specific SGW and a specific PGW may be appropriately selected in accordance with a transmission destination of a packet, a service to be provided, or the like instead of a configuration in which they are connected. Also, for simplicity, basically, the first PGW-U 52A and the second PGW-U 52B are collectively referred to as a PGW-U 52 in FIG. 18 and the drawings subsequent thereto.

Hereinafter, as in the first embodiment, three methods will be described as a connection control method to be executed by the MME 30. Because the majority of the series of processing steps is similar to the processing steps described in the first embodiment, description of similar processing steps will be partially omitted. Also, although a case in which the UE 10 is connectable to two SGW-Us will be described, the present embodiment can also be applied to a case in which the UE 10 can be connected to three or more SGW-Us as in the first embodiment.

(First Method: Re-Establishment of Plurality of Bearers)

In the first method of the first embodiment, a method of performing control so that bearers are provided between both the first SGW 40A and the second SGW 40B and the UE 10 in the MME 30 when the MME 30 receives a request for establishing a bearer from the first SGW 40A or the second SGW 40B to the UE 10 has been described. When the above-described method is applied to the second embodiment, the method becomes a method of performing control so that bearers are provided between both the first SGW-U 42A and the second SGW-U 42B and the UE 10 in the MME 30 if the MME 30 receives a request for establishing a bearer from the first SGW-U 42A or the second SGW-U 42B to the UE 10. The above-described method will be described.

A specific procedure will be described with reference to the sequence diagrams of FIGS. 18 and 19. Although FIG. 18 and FIG. 19 correspond to FIGS. 7 and 8, respectively, device configurations of the SGW and the PGW are different.

First, description will be given with reference to FIG. 18. When the PGW-U 52 newly acquires packet data addressed to the UE 10 from the packet network, the PGW-U 52 transfers the packet data to the appropriate SGW-U with reference to the packet data (Downlink Data: S201). Here, an example in which the PGW-U 52 transfers the packet data to the first SGW-U 42A is shown. When the packet data addressed to the UE 10 is received, the first SGW-U 42A notifies the MME 30 of reception of the packet data addressed to the UE 10 via the SGW-C 41, thereby requesting bearer establishment (Downlink Data Notification: S202). When the request from the first SGW-U 42A is received, the request reception unit 31 of the MME 30 responds to the first SGW-U 42A via the SGW-C 41 (Downlink Data Notification Ack: S203) and determines whether a bearer may be established for the first SGW-U 42A (S204). Here, by referring to information stored in the path information storage unit 32, it is checked whether a bearer may be established with the first SGW-U 42A in accordance with a request from the first SGW-U 42A. When the process is continued, the bearer establishment processing unit 33 of the MME 30 performs paging for the UE 10 via the eNB 20 (Paging: S205).

In correspondence with paging, the UE 10 transmits a connection request (a bearer establishment request) to the MME 30 via the eNB 20 (Service Request: S206). Thereafter, through an authentication process (Authentication/Security: S207) related to bearer establishment with the UE 10 and the PGW-U 52 and communication and processing related to bearer establishment (Initial Context Setup Request: S208 and Radio Bearer Establishment: S209), data transmission from the UE 10 to the first SGW-U 42A is enabled (Uplink Data: S210). A bearer between the UE 10 and the eNB 20 is established by the eNB 20 notifying the MME 30 that the processing related to the creation of the bearer on the UE 10 side has been completed (Initial Context Setup Complete: S211).

Next, the bearer establishment processing unit 33 of the MME 30 instructs the first SGW-U 42A to establish a bearer on an upstream side of the MME 30 via the SGW-C 41 (Modify Bearer Request: S212). On the basis of this instruction, the first SGW-U 42A performs a bearer establishment process. Also, the SGW-C 41 receiving the instruction from the MME 30 instructs the PGW-U 52 to perform setup related to a bearer reaching the UE 10 through the first SGW-U 42A (Modify Bearer Request: S213).

The PGW-U 52 performs a process of setup related to the bearer and notifies the SGW-C 41 that the process has been completed via the PGW-C 51 when the process has been completed (Modify Bearer Response: S214). The SGW-C 41 receiving this notification notifies the MME 30 that the processing related to the establishment of the bearer on the upstream side has been completed (Modify Bearer Response: S215). Thereby, a bearer for transmitting packet data from the first SGW-U 42A to the UE 10 is established, and data transmission from the first SGW-U 42A to the UE 10 is enabled (Downlink Data: S216). According to the above procedure, a bearer that passes through the first SGW-U 42A (corresponding to the bearer B02 in FIG. 6) is established.

Next, processing related to establishment of a bearer that passes through the second SGW-U 42B is started. This processing is substantially similar to processing related to establishment of a bearer that passes through the first SGW-U 42A. In other words, by notifying the eNB 20 of the information for identifying the address of the second SGW-U 42B, an instruction of bearer establishment associated with the second SGW-U 42B is issued (Initial Context Setup Request: S217). Thereby, the processing related to the bearer establishment between the eNB 20 and the UE 10 is performed (Radio Bearer Establishment: S218). Thereby, a bearer for packet data to be transmitted from the UE 10 is established and the eNB 20 notifies the MME 30 that the processing related to the creation of the bearer of the UE 10 side has been completed (Initial Context Setup Complete: S219). When the MME 30 receives the notification from the eNB 20 side, a bearer between the UE 10 and the eNB 20 is established.

Next, the bearer establishment processing unit 33 of the MME 30 instructs the second SGW-U 42B to establish a bearer on the upstream side of the eNB 20 via the SGW-C 41 (Modify Bearer Request: S220). On the basis of this instruction, the second SGW-U 42B performs a bearer establishment process. Also, the SGW-C 41 instructs the PGW-U 52 to perform setup related to the bearer reaching the UE 10 through the second SGW-U 42B via the PGW-C 51 (Modify Bearer Request: S221).

When the PGW-U 52 performs a process of setup related to the bearer and completes the process, the SGW-C 41 is notified of the setup completion for the second SGW-U 42B via the PGW-C 51 (Modify Bearer Response: S222). The SGW-C 41 receiving this notification notifies the MME 30 that the processing related to the establishment of the bearer on the upstream side has been completed (Modify Bearer Response: S223). Thereby, a bearer for transmitting packet data from the second SGW-U 42B to the UE 10 is established. According to the above procedure, a bearer that passes through the second SGW-U 42B (corresponding to the bearer B03 in FIG. 6) is established. By receiving this result, the MME 30 updates information indicating the establishment status of the bearer of the UE 10 in the path information storage unit 32 to "CONNECTED" and stores the updated information. Then, the processing related to the bearer establishment performed by the bearer establishment processing unit 33 is completed.

According to the above processing, if the first SGW-U 42A receives the packet data, a bearer that passes through the first SGW-U 42A and a bearer that passes through the second SGW-U 42B are established as a bearer connecting the UE 10 and the PGW-U 52. Also, in the MME 30, the information indicating the establishment status of the bearer of the UE 10 becomes information consistent with the actual status, i.e., information indicating the status in which the bearer is established.

Figure 19:
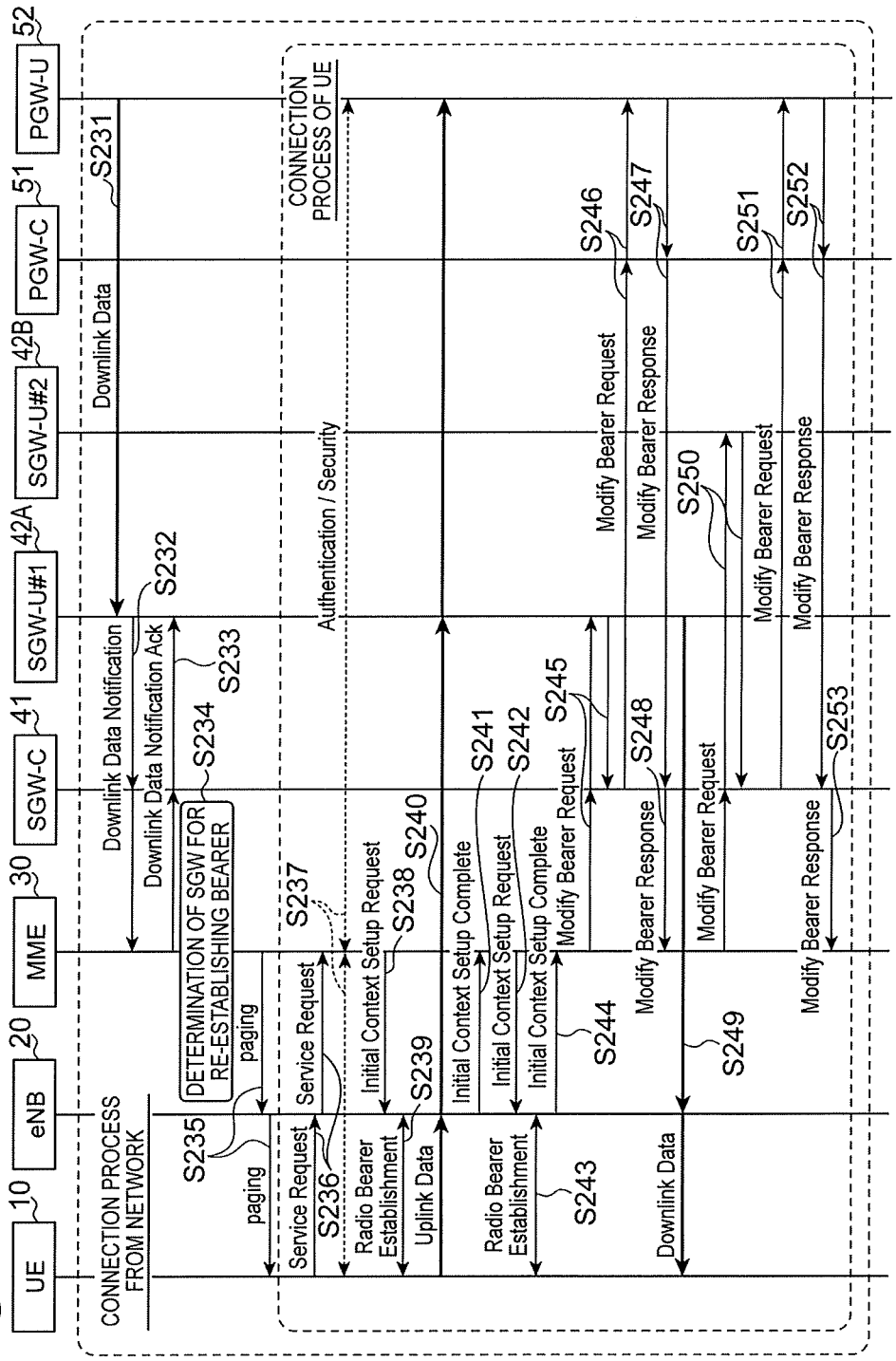
FIG. 19 is a sequence diagram illustrating a modified example of the connection control method (the first method).

In FIG. 19, processing orders are different from each other when two bearers for which pass-through SGWs are different from each other are established between the UE 10 and the PGW-U 52. FIG. 19 corresponds to FIG. 8. In other words, among processes related to the establishment of the two bearers, bearer establishment processes on the upstream side are performed after bearer establishment processes on the downstream side of the MME 30 are completed at the same time.

Specifically, when the first SGW-U 42A receives the packet data addressed to the UE 10 transmitted from the PGW-U 52 to the first SGW-U 42A (Downlink Data: S231), the MME 30 is notified of the reception via the SGW-C 41 and the bearer establishment is requested (Downlink Data Notification: S232). When the request from the first SGW-U 42A is received, the request reception unit 31 of the MME 30 responds to the first SGW-U 42A via the SGW-C 41 (Downlink Data Notification Ack: S233) and determines whether a bearer may be established for the first SGW-U 42A (S234). If the subsequent processing is continued (it is determined to establish a bearer), the bearer establishment processing unit 33 of the MME 30 performs paging for the UE 10 via the eNB 20 (Paging: S235).

In correspondence with paging, the UE 10 transmits a connection request (a bearer establishment request) to the MME 30 via the eNB 20 (Service Request: S236). Thereafter, through an authentication process (Authentication/Security: S237) related to bearer establishment with the UE 10 and the PGW-U 52 and communication and processing related to bearer establishment (Initial Context Setup Request: S238 and Radio Bearer Establishment: S239), data transmission from the UE 10 to the first SGW-U 42A is enabled (Uplink Data: S240). The eNB 20 notifies the MME 30 that processing related to creation of a bearer of the UE 10 side has been completed (Initial Context Setup Complete: S241), so that a bearer between the UE 10 and the eNB 20 is established.

Next, by notifying the eNB 20 of information for identifying the address of the second SGW-U 42B, an instruction of bearer establishment with the second SGW-U 42B is issued (Initial Context Setup Request: S242). Thereby, processing related to the bearer establishment between the eNB 20 and the UE 10 is performed (Radio Bearer Establishment: S243). Thereby, a bearer for packet data to be transmitted from the UE 10 is established, and the eNB 20 notifies the MME 30 that the processing related to the creation of the bearer of the UE 10 has been completed (Initial Context Setup Complete: S244). When the MME 30 receives the notification from the eNB 20 side, a bearer between the UE 10 and the eNB 20 is established.

Thereafter, processing related to each of the bearer that passes through the first SGW-U 42A and the bearer that passes through the second SGW-U 42B is performed.

First, the bearer establishment processing unit 33 of the MME 30 instructs the first SGW-U 42A to establish a bearer on the upstream side of the eNB 20 via the SGW-C 41 (Modify Bearer Request: S245). On the basis of this instruction, the first SGW-U 42A performs a bearer establishment process. Also, the SGW-C 41 receiving the instruction from the MME 30 instructs the PGW-U 52 to perform setup related to a bearer reaching the UE 10 through the first SGW-U 42A via the PGW-C 51 (Modify Bearer Request: S246).

The PGW-U 52 performs a process of setup related to the bearer and notifies the SGW-C 41 that the process has been completed via the PGW-C 51 when the process has been completed (Modify Bearer Response: S247). The SGW-C 41 receiving this notification notifies the MME 30 that the processing related to the establishment of the bearer on the upstream side has been completed (Modify Bearer Response: S248). Thereby, a bearer for transmitting packet data from the first SGW-U 42A to the UE 10 is established, and data transmission from the first SGW-U 42A to the UE 10 is enabled (Downlink Data: S249). According to the above procedure, a bearer that passes through the first SGW-U 42A (corresponding to the bearer B02 in FIG. 6) is established.

Next, the bearer establishment processing unit 33 of the MME 30 instructs the second SGW-U 42B to establish a bearer on the upstream side of the eNB 20 via the SGW-C 41 (Modify Bearer Request: S250). On the basis of this instruction, the second SGW-U 42B performs a bearer establishment process. Also, the SGW-C 41 instructs the PGW-U 52 to perform setup related to the bearer reaching the UE 10 through the second SGW-U 42B via the PGW-C 51 (Modify Bearer Request: S251).

The PGW-U 52 performs a process of setup related to the bearer and notifies the SGW-C 41 that the process has been completed with respect to the second SGW-U 42B via the PGW-C 51 when the process has been completed (Modify Bearer Response: S252). The SGW-C 41 receiving this notification notifies the MME 30 that the processing related to the establishment of the bearer on the upstream side has been completed (Modify Bearer Response: S253). Thereby, a bearer for transmitting packet data to the UE 10 is established on the downstream side from the second SGW-U 42B. According to the above procedure, a bearer that passes through the second SGW-U 42B (corresponding to the bearer B03 in FIG. 6) is established. By receiving this result, the MME 30 updates information indicating the establishment status of the bearer of the UE 10 in the path information storage unit 32 to "CONNECTED" and stores the updated information. Then, the processing related to the bearer establishment performed by the bearer establishment processing unit 33 is completed.

Figure 18:
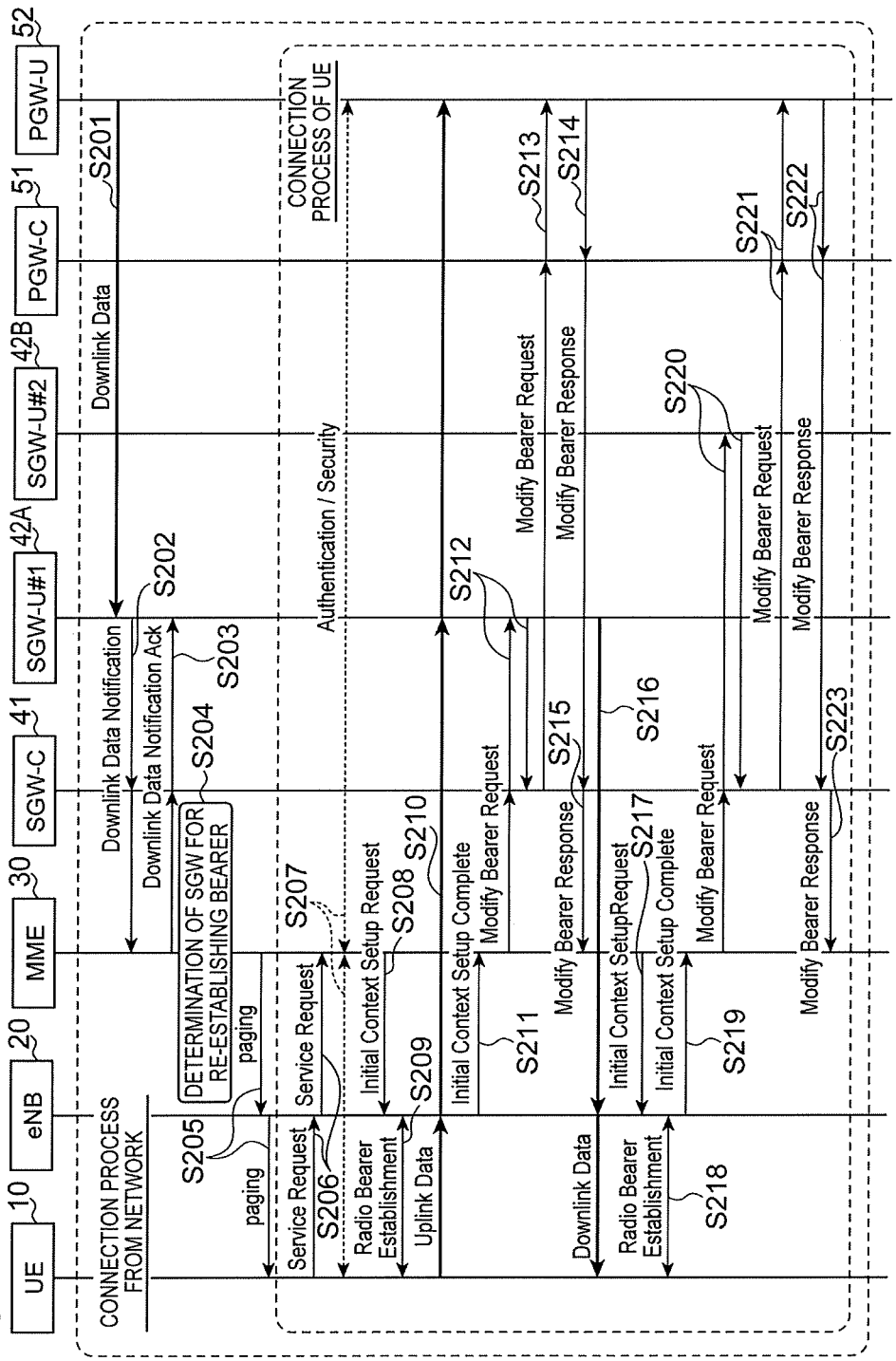
FIG. 18 is a sequence diagram illustrating a connection control method (a first method).

According to the above processing, if the first SGW-U 42A receives the packet data, a bearer that passes through the first SGW-U 42A and a bearer that passes through the second SGW-U 42B are established as a bearer connecting the UE 10 and the PGW-U 52 as illustrated in FIG. 18. In this manner, a process may be executed in the order illustrated in FIG. 19, and it is also possible to prevent inconsistency in management of the connected status (the bearer establishment status) of the UE 10 from occurring within the network in such a case.

(Second Method: Management of Connected Status for Each SGW)

As a second method, a method of storing a bearer establishment status for each UE 10 and each SGW instead of storing the bearer establishment status for each UE 10 in the path information storage unit 32 of the MME 30 is conventionally used.

Although the path information storage unit 32 of the MME 30 stores the establishment status of the bearer for each of the UE 10 and the SGW in the second method of the first embodiment, the bearer establishment status is stored in the path information storage unit 32 of the MME 30 for each of the UE 10 and the SGW-U because a device through which a bearer passes is the SGW-U in the second method of the second embodiment.

A specific procedure will be described with reference to the sequence diagrams of FIGS. 20 and 21. Although FIGS. 20 and 21 correspond to FIGS. 11 and 13, respectively, the device configurations of the SGW and the PGW are different.

First, description will be given with reference to FIG. 20. As a premise, it is assumed that both the bearer that passes through the first SGW-U 42A and the bearer that passes through the second SGW-U 42B are not established (are released). At this time, when the PGW-U 52 newly acquires packet data addressed to the UE 10 from the packet network, the PGW-U 52 transfers the packet data to the first SGW-U 42A with reference to the packet data (Downlink Data: S261). When the packet data addressed to the UE 10 is received, the first SGW-U 42A requests the MME 30 to establish a bearer. Thereby, a process of establishing a bearer via the first SGW-U 42A is performed (S262). As a result, a bearer that passes through the first SGW-U 42A (corresponding to B04 in FIG. 9) is established and the establishment status of the bearer that passes through the first SGW-U 42A of the UE 10 is updated to "CONNECTED" in the path information storage unit 32 of the MME 30. Thereby, packet data can be transmitted from the first SGW-U 42A to the UE 10 (Downlink Data: S263).

Thereafter, in a status in which there is a bearer that passes through the first SGW-U 42A, the PGW-U 52 newly acquires packet data addressed to the UE 10 from the packet network and transfers the packet data to the second SGW-U 42BSGW with reference to the packet data (Downlink Data: S264).

The second SGW-U 42B requests bearer establishment by notifying the MME 30 of the reception of the packet data addressed to the UE 10 via the SGW-C 41 (Downlink Data Notification: S265). When a request from the second SGW-U 42B is received, the request reception unit 31 of the MME 30 responds to the second SGW-U 42B via the SGW-C 41 (Downlink Data Notification Ack: S266) and checks the connected status and checks the position of the UE 10 (S267). Although only the connected status check using the information stored in the path information storage unit 32 is performed in such a step in the case of the first method, it is possible to identify a cell in which the UE 10 is located on the MME 30 side because the UE 10 already has performed a process of establishing a bearer that passes through the first SGW-U 42A in the case of the second method. Therefore, after the cell in which the UE 10 is located is identified, identification information is used. If the subsequent processing is continued (it is determined to establish a bearer) as a result of checking the connected status, the bearer establishment processing unit 33 of the MME 30 performs paging for the UE 10 via the eNB 20 (Paging: S268). Here, as in the method illustrated in FIG. 11, paging only for a specific cell is performed using information related to the cell in which the UE 10 is located.

In correspondence with paging, the UE 10 transmits a connection request (a bearer establishment request) to the MME 30 via the eNB 20 (Service Request: S269). The MME 30 receives the bearer establishment request from the UE 10, so that the MME 30 starts processing related to establishment of a bearer between the UE 10 and the first SGW-U 42A and establishment of a bearer between the UE 10 and the second SGW-U 42B.

In the case of the second method, because the bearer associated with the first SGW-U 42A has already been established, the authentication process may be omitted (S270). Thereafter, a process for establishing a bearer is performed (S271). As a result, a bearer that passes through the second SGW-U 42B (corresponding to the bearer B05 in FIG. 9) is established and the establishment status of the bearer that passes through the second SGW-U 42B of the UE 10 is updated to "CONNECTED" in the path information storage unit 32 of the MME 30. Thereby, packet data can be transmitted from the second SGW-U 42B to the UE 10 (Downlink Data: S272).

According to the above process, both a bearer that passes through the first SGW-U 42A and a bearer that passes through the second SGW-U 42B are established, so that packet data can be transmitted and received through either one of the bearers. Also, in the MME 30, infatuation indicating the establishment status of the bearer related to the UE 10 can be changed to information consistent with the actual status, i.e., information indicating a status in which two bearers are established.

Figure 20:
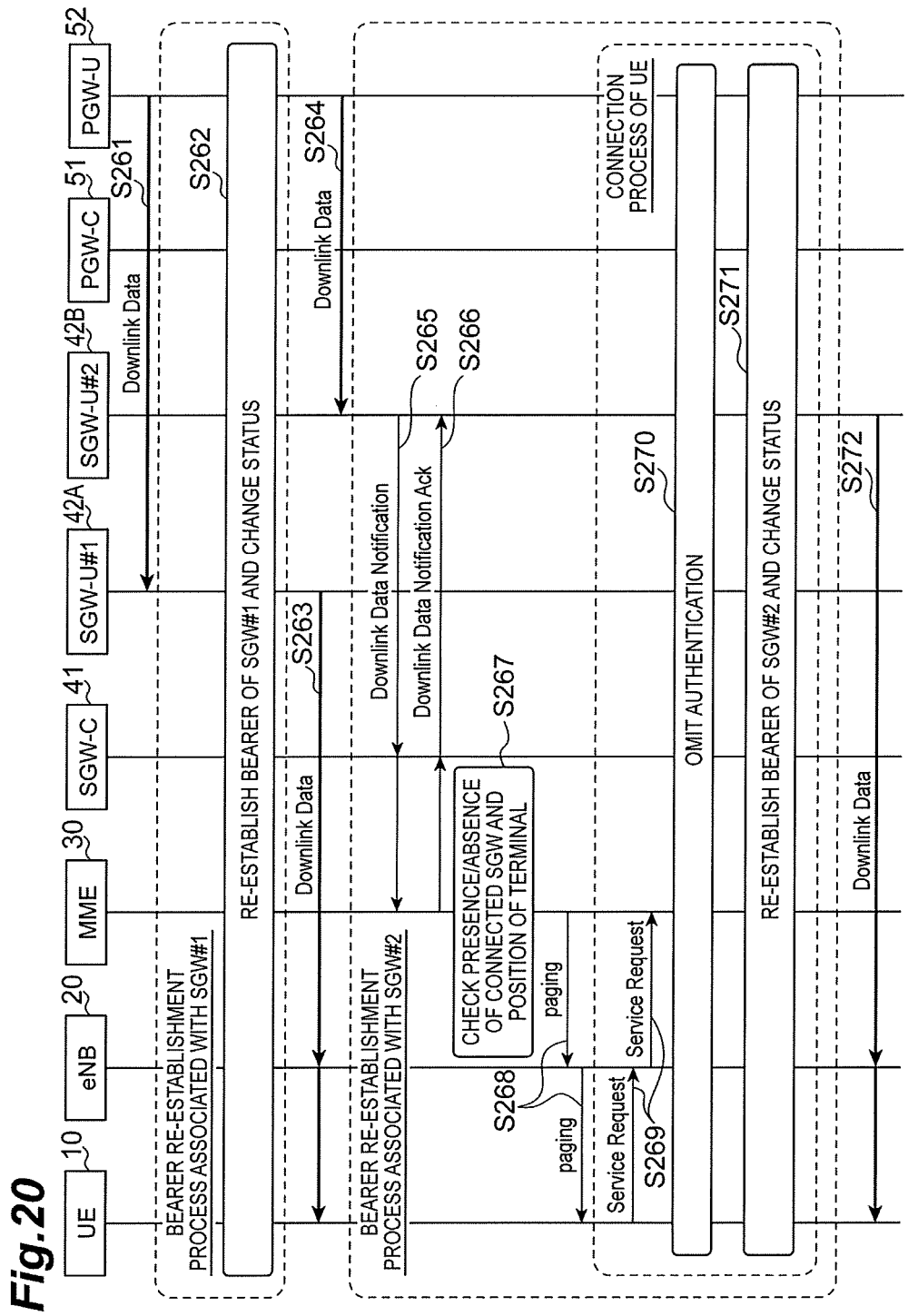
FIG. 20 is a sequence diagram illustrating a connection control method (a second method).
Figure 21:
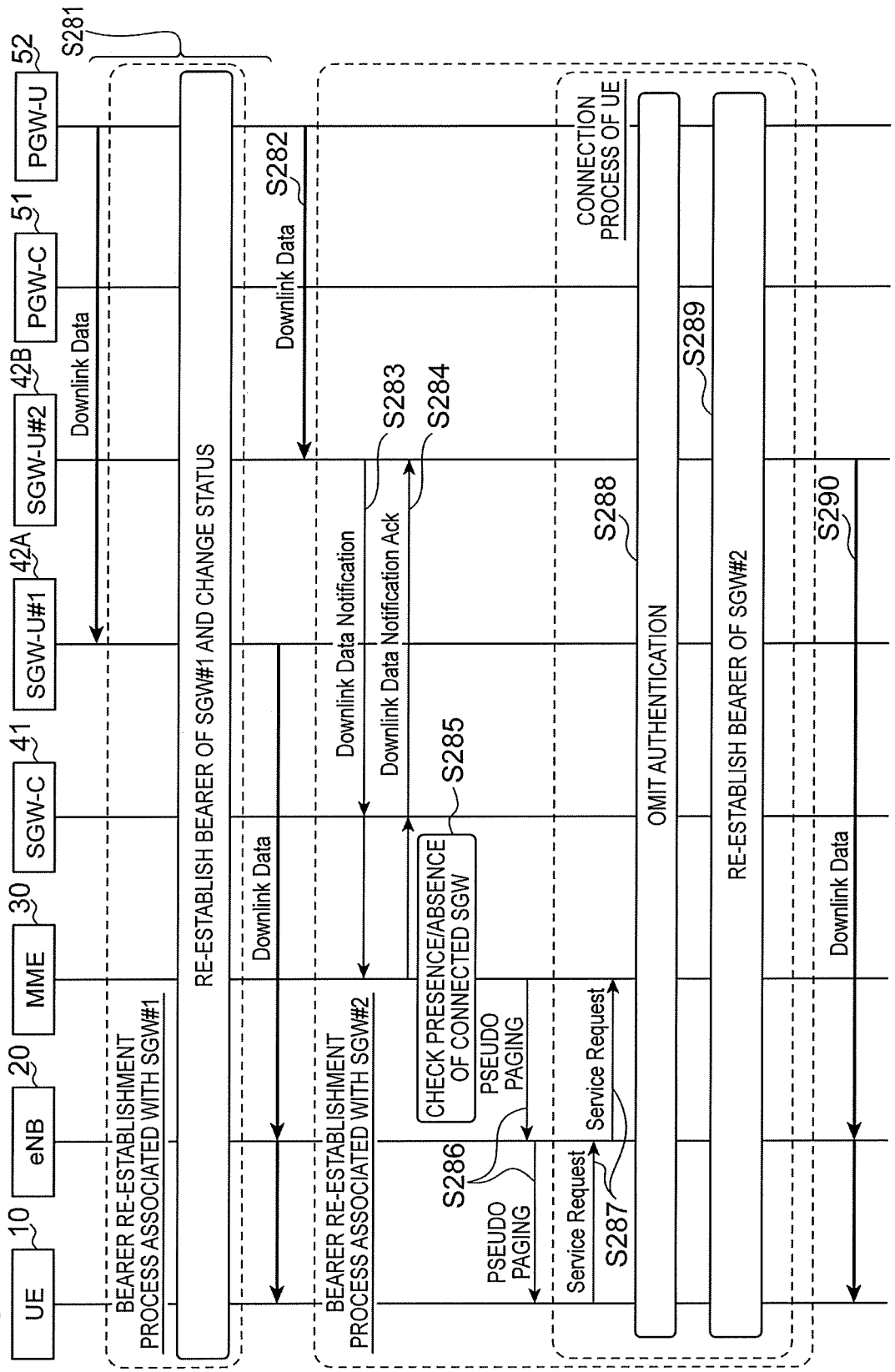
FIG. 21 is a sequence diagram illustrating a modified example of the connection control method (the second method).

In the method illustrated in FIG. 21, a method of performing paging for the UE 10 when a bearer that passes through the second SGW-U 42B is provided is different from that of FIG. 20.

First, processing related to the establishment of the bearer when the first SGW-U 42A receives the packet data addressed to the UE 10 (S281) is the same as the series of processing steps (S261 to S263) illustrated in FIG. 20.

Next, in a status in which there is a bearer that passes through the first SGW-U 42A, the PGW-U 52 is assumed to newly acquire packet data addressed to the UE 10 from the packet network and transfer the packet data to the second SGW-U 42B with reference to the packet data (Downlink Data: S282).

The second SGW-U 42B requests establishment of a bearer by notifying the MME 30 of the reception of the packet data addressed to the UE 10 via the SGW-C 41 (Downlink Data Notification: S283). The MME 30 responds to the request via the SGW-C 41 (Downlink Data Notification Ack: S284) and checks the connected status (S285). Here, only the connected status is checked as in the example of FIG. 13. If the subsequent processing is continued (it is determined to establish a bearer) as a result of checking the connected status, the bearer establishment processing unit 33 of the MME 30 performs paging (pseudo paging) for the UE 10 via the eNB 20 (pseudo Paging: S286). This pseudo paging is the same as the processing used in the method illustrated in FIG. 13.

The UE 10 transmits a connection request (a bearer establishment request) to the MME 30 via the eNB 20 in correspondence with the pseudo paging. The MME 30 receives the bearer establishment request from the UE 10 (Service Request: S287) and therefore the MME 30 starts processing related to the establishment of the bearer between the UE 10 and the first SGW-U 42A and the establishment of the bearer between the UE 10 and the second SGW-U 42B.

As in the method illustrated in FIG. 20, the authentication process may be omitted (S288), and then a series of processing steps for establishing a bearer is performed (S289).

As a result, a bearer that passes through the second SGW-U 42B is established and the establishment status of the bearer that passes through the second SGW-U 42B of the UE 10 is updated to "CONNECTED" in the path information storage unit 32 of the MME 30. Thereby, packet data can be transmitted from the second SGW-U 42B to the UE 10 (Downlink Data: S290).

As described above, in the method illustrated in FIG. 21, both the bearer that passes through the first SGW-U 42A and the bearer that passes through the second SGW-U 42B are established and packet data can be transmitted and received through either one of the bearers. Also, in the MME 30, the information indicating the establishment status of the bearer related to the UE 10 can be changed to information consistent with the actual status, i.e., information indicating a status in which two bearers are established.

As in the first embodiment, paging may be performed using a conventional paging method.

(Third Method: Unification of Bearers)

When an established bearer is released after the bearer is established and transmission and reception of packet data are performed as a third method, a conventional method is a method of fixing a bearer for transmitting packet data from the PGW-U by leaving one bearer and releasing the other bearers from bearers regularly provided between the PGW-U and two or more SGW-Us.

Although a case in which the bearer between the PGW and the SGW is released has been described in the third method of the first embodiment, a case in which a bearer is provided between the PGW-U and the SGW-U will be described in the second embodiment.

A specific procedure will be described with reference to the sequence diagram of FIG. 22. As a premise, it is assumed that a bearer that passes through the first SGW-U 42A associated with the UE 10 (corresponding to the bearer B06 in FIG. 15) is established and a bearer that passes through the second SGW-U 42B associated with the UE 10 is not established. Also, the bearer between the second SGW-U 42B and the PGW-U 52 (corresponding to the bearer B07 in FIG. 15) is established.

At this time, if the eNB 20 determines that it is necessary to release the bearer that passes through the first SGW-U 42A, the UE 10 is notified of the release of the bearer (RRC Connection Release: S301) and transmits a request for releasing a bearer that passes through the first SGW-U 42A to the MME 30 (S1 UE Context Release Request: S302). When the request from the eNB 20 is received, the request reception unit 31 of the MME 30 continues the processing related to the release of the bearer that passes through the first SGW-U 42A after checking the information stored in the path information storage unit 32. The bearer release processing unit 34 of the MME 30 transmits a request related to the release of the bearer to the first SGW-U 42A via the SGW-C 41 (Release Access Bearer Request: S303). Meanwhile, on the basis of the request, the first SGW-U 42A performs processing related to the release of the bearer and then transmits a processing result to the MME 30 via the SGW-C 41 (Release Access Bearer Response: S304).

Next, the bearer release processing unit 34 of the MME 30 performs a process of releasing the PDN connection to another SGW-U for which no bearer is provided. In the case of the present embodiment, the bearer release processing unit 34 of the MME 30 transmits a request for processing related to the release of the PDN connection to the SGW-C 41. On the basis of the request from the MME 30, the SGW-C 41 transmits a request for processing related to the release of the PDN connection to the second SGW-U 42B (Delete Session Request: S305). On the basis of this request, the second SGW-U 42B performs processing related to release of the bearer associated with the PGW-U 52. Also, the SGW-C 41 transmits the request for the processing related to the release of the PDN connection to the PGW-U 52 via the PGW-C 51 and performs a series of processing steps (Delete Session Request: S306 and Delete Session Response: S307). When the series of processing steps in the second SGW-U 42B and the PGW-U 52 is completed, the SGW-C 41 transmits a processing result to the MME 30 (Delete Session Response: S308).

Further, the MME 30 performs the processing related to the release of the PDN connection to the eNB 20 and the UE 10 on the downstream side (S309). Because a series of information transmitted and received for the PDN connection illustrated in FIG. 22 is information conventionally used for releasing the PDN connection, detailed description thereof will be omitted. By performing the above-described processing, the PDN connection of the second SGW-U 42B side is released.

Thereafter, the eNB 20 is notified that the series of processing steps related to the release of the bearer has been completed in correspondence with a bearer release request (S1 UE Context Release Request: S302) for the MME 30 (S1 UE Context Release Command: S310). The eNB 20 responds to the notification from the MME 30 (S1 UE Context Release Complete: S311), thereby completing the series of processing steps. Also, the MME 30 updates the establishment status of the bearer related to the UE 10 in the path information storage unit 32 to "IDLE."

Figure 22:
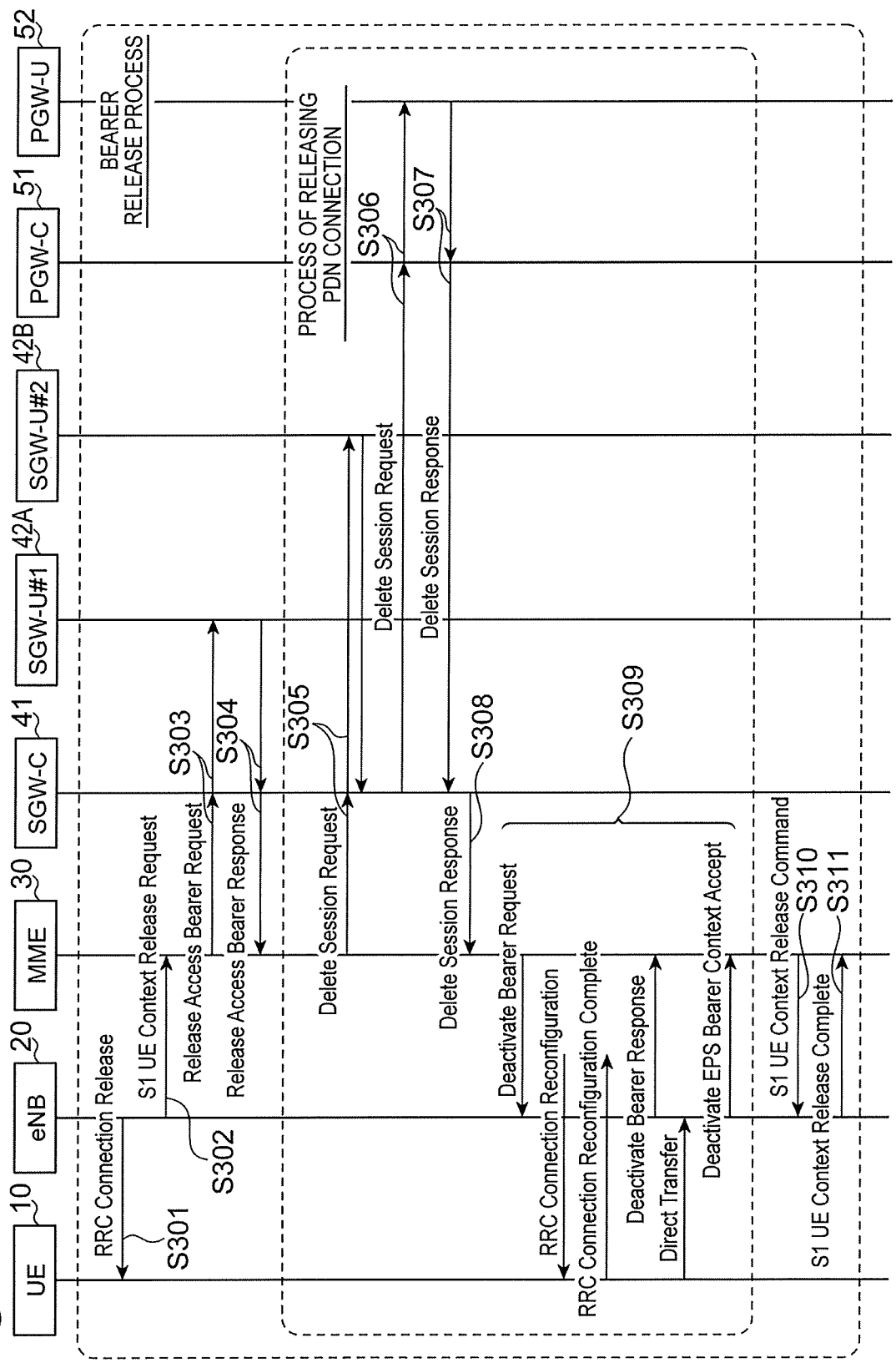
FIG. 22 is a sequence diagram illustrating a connection control method (a third method).

By performing the process illustrated in FIG. 22 described above, it becomes possible to transmit and receive packet data for which a bearer is provided through only the UE 10, the first SGW-U 42A, and the PGW-U 52. Also, because the bearer establishment status stored for each UE 10 in the path information storage unit 32 of the MME 30 corresponds to the establishment status of the bearer that passes through the first SGW-U 42A, control in which inconsistency within a network with respect to the establishment status of the bearer related to the UE 10 does not occur is implemented. However, the present method is different from the first method and the second method in that it is necessary to re-establish the PDN connection in order to obtain a status in which the second SGW-U 42B can be used.

As described above, a connection control method according to an aspect of the present invention is a connection control method implemented by a communication system including a UE, two or more communication control devices which are devices for controlling transmission and reception of data of the UE, and a connection control device for performing processing related to establishment and release of communication paths provided between the two or more communication control devices and the UE, the connection control method including: a request reception step in which the connection control device receives a path establishment request related to the communication path associated with the UE from one communication control device included in the two or more communication control devices; a path establishment step in which the connection control device starts processing related to establishment of communication paths associated with the UE for all communication control devices which are the two or more communication control devices including the one communication control device and for which the connection control device performs the processing related to the establishment and release of the communication path associated with the UE when the path establishment request is received; and an information update step in which the connection control device updates information related to an establishment status of the communication path associated with the UE stored in the storage unit on the basis of an establishment result of the communication path in the path establishment step.

Also, a connection control device according to an aspect of the present invention is a connection control device included in a communication system including a UE, two or more communication control devices which are devices for controlling transmission and reception of data of the UE, and a connection control device for performing processing related to establishment and release of communication paths provided between the two or more communication control devices and the UE, the connection control device including: a storage unit configured to store information related to an establishment status of a communication path in the UE for each UE; a request reception unit configured to receive a path establishment request related to the communication path associated with the UE from one communication control device included in the two or more communication control devices; and a path establishment unit configured to start processing related to establishment of communication paths associated with the UE for all communication control devices which are the two or more communication control devices including the one communication control device and for which the connection control device performs processing related to establishment and release of the communication path associated with the UE when the request reception unit receives the path establishment request and configured to update information related to an establishment status of the communication path associated with the UE stored in the storage unit on the basis of an establishment result of the communication path.

According to the above-described connection control method and connection control device, if a path establishment request from one communication control device included in two or more communication control devices is received, communication paths associated with a UE are established for all communication control devices which are the two or more communication control devices including the one communication control device and for which the connection control device performs processing related to establishment and release of the communication path associated with the UE and information related to an establishment status of a communication path of each UE is updated in a storage unit on the basis of an establishment result. Therefore, information stored in the storage unit is updated on the basis of establishment or release of communication paths associated with some communication control devices included in the two or more communication control devices and therefore it is possible to prevent inconsistency between the information stored in the storage unit and the establishment status of the communication path in the UE from occurring.

Also, a connection control method according to another aspect of the present invention is a connection control method implemented by a communication system including a UE, two or more communication control devices which are devices for controlling transmission and reception of data of the UE, and a connection control device for performing processing related to establishment and release of communication paths provided between the two or more communication control devices and the UE, the connection control method including: a request reception step in which the connection control device receives a path establishment request related to the communication path associated with the UE from one communication control device included in the two or more communication control devices; a path establishment step in which the connection control device starts processing related to establishment of a communication path between the one communication control device and the UE when the path establishment request is received; and an information update step in which the connection control device updates information related to an establishment status of the communication path between the one communication control device and the UE stored in a storage unit on the basis of an establishment result of the communication path in the path establishment step.

Also, a connection control device according to another aspect of the present invention is a connection control device included in a communication system including a UE, two or more communication control devices which are devices for controlling transmission and reception of data of the UE, and a connection control device for performing processing related to establishment and release of communication paths provided between the two or more communication control devices and the UE, the connection control device including: a storage unit configured to store information related to an establishment status of a communication path in the UE for each UE and each communication control device to which the UE can be connected; a request reception unit configured to receive a path establishment request related to the communication path associated with the UE from one communication control device included in the two or more communication control devices; and a path establishment unit configured to start processing related to establishment of a communication path between the one communication control device and the UE when the request reception unit receives the path establishment request and update information related to the establishment status of the communication path between the one communication control device and the UE stored in the storage unit on the basis of an establishment result of the communication path.

According to the above-described connection control method and connection control device, if a path establishment request from one communication control device included in two or more communication control devices is received and a communication path associated with the one communication control device is established, information related to the establishment status of the communication path between the one communication control device and the UE stored in the storage unit is updated on the basis of an establishment result. Therefore, even when processing related of establishment or release of communication paths associated with some communication control devices included in the two or more communication control devices is performed, it is possible to prevent inconsistency between information stored in a storage unit and an establishment status of the communication path in the UE from occurring.

The present invention has been described above in detail on the basis of the embodiments thereof. However, the present invention is not limited to the above-described embodiments. The present invention can be implemented as a modified and changed form without departing from the spirit and scope of the present invention defined by the appended claims. Accordingly, the present description is given merely by way of illustration and does not have any restrictive meaning for the present embodiment.

For example, each of the devices included in the communication systems 1 and 2 described in the above embodiments may be configured by combining a plurality of devices. Also, a plurality of devices included in the communication systems 1 and 2 may be implemented by a single device.

Also, signal names used in the process of establishing and releasing bearers described in the above-described embodiment are examples. In other words, signals transmitted and received between the devices of the communication systems 1 and 2 during a process of establishing and releasing a bearer are not limited to those described in the above-described embodiments. Also, the order of processing may be changed as necessary.

(Others)

Notification of information is not limited to the aspects/embodiments described in the present description and may be performed in other methods. For example, the notification of information may be performed by physical layer signaling (e.g., downlink control information (DCI) and uplink control information (UCI)), upper layer signaling (e.g., radio resource control (RRC) signaling, medium access control (MAC) signaling, notification information (master information block (MB), system information block (SIB))), other signals, or a combination thereof. Also, the RRC signaling may be referred to as an RRC message, and may be, for example, an RRC Connection Setup message, an RRC Connection Reconfiguration message, or the like.

Each aspect/embodiment described in the present description may be applied to a system using Long Term Evolution (LIE), LTE-Advanced (LTE-A), SUPER 3G IMT-Advanced, 4G, 5G, Future Radio Access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wide band (UWB), Bluetooth (registered trademark), another appropriate system, and/or a next generation system extended on the basis thereof.

The specific operation that is performed by a specific device in the present description may be performed by an upper node with respect thereto in some cases. For example, if a specific device is a base station, it is obvious that various operations to be performed for communication with a terminal can be performed by a base station and/or a network node other than the base station (for example, an MME, an S-GW, or the like may be conceived, but the network node is not limited thereto) in a network including one or more network nodes including the base station. Although a case in which the number of network nodes other than the base station is one in the above description is exemplified, a combination of a plurality of other network nodes (for example, the MME and the S-GW) may be used.

Information or the like can be output from an upper layer (or a lower layer) to a lower layer (or an upper layer). The information or the like may be input/output via a plurality of network nodes.

The input/output information and the like may be stored in a specific place (for example, a memory) and may be managed in a management table. Information or the like to be input/output can be overwritten, updated, or additionally written. Output information or the like may be deleted. The input information or the like may be transmitted to another device.

A determination may be made according to a value (0 or 1) represented by 1 bit, may be made according to a Boolean value (true or false), or may be made according to a comparison of numerical values (e.g., a comparison with a predetermined value).

Each aspect/embodiment described in the present description may be used alone, may be used in combination, or may be used by being switched according to the execution. Also, a notification of predetermined information (e.g., a notification of "being X") is not limited to a notification performed explicitly, and may be performed implicitly (e.g., a notification of predetermined information is not performed).

The software shall be construed broadly to include instructions, instruction sets, codes, code segments, program codes, programs, subprograms, software modules, applications, software applications, software packages, routines, subroutines, objects, executable files, threads of execution, procedures, functions, and the like, regardless of whether the software is referred to as software, firmware, middleware, microcode, hardware description language or whether the software is referred to as another name.

Also, software, instructions, and the like may be transmitted and received via a transmission medium. For example, if software is transmitted from a website, a server or another remote source using wired technologies such as a coaxial cable, an optical fiber cable, a twisted pair, and a digital subscriber line (DSL) and/or wireless technologies such as infrared rays, radio, and microwaves, the wired technologies and/or the wireless technologies are included within the definition of the transmission medium.

"Information" described in the present description may be represented using any of a variety of different technologies. For example, data, instructions, commands, information, signals, bits, symbols, and chips that may be mentioned throughout the above description may be represented by voltages, currents, electromagnetic waves, magnetic fields or particles, optical fields or photons, or any combination thereof.

Also, the terms described in the present description and/or the terms necessary for understanding the present description may be replaced with terms having the same or similar meanings. For example, a channel and/or a symbol may be a signal. Also, a signal may be a message. Also, the component carrier (CC) may be referred to as a carrier frequency, a cell, or the like.

The terms "system" and "network" used in the present description are used interchangeably.

Also, information, parameters, and the like described in the present description may be represented by absolute values, may be expressed as relative values from predetermined values, or may be represented by other corresponding information. For example, a radio resource may be indicated by an index.

The names used for the above-described parameters are not limited in any respect. Furthermore, mathematical expressions and the like using these parameters may be different from those explicitly disclosed in the present description. Because various channels (e.g., PUCCH, PDCCH, and the like) and information elements (e.g., TPC and the like) can be identified by any suitable name, the various names assigned to these various channels and information elements are not limited in any respect.

A base station can accommodate one or more (e.g., three) cells (also called sectors). If the base station accommodates a plurality of cells, the entire coverage area of the base station can be divided into a plurality of smaller areas, each of which can provide a communication service through a base station subsystem (e.g., an indoor small base station (RRH: Remote Radio Head)). The term "cell" or "sector" refers to a part or all of the coverage area of a base station and/or a base station subsystem that performs a communication service in this coverage. Further, the terms "base station," "eNB," "cell," and "sector" may be used interchangeably in the present description. The base station may be referred to as a term such as fixed station, a Node B, an eNodeB (eNB), an access point, a femtocell, or a small cell.

A mobile communication terminal may be also called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms.

The term "determining" used in the present description may encompass a wide variety of operations. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, comparing, and the like. In other words, "determining" can include regarding a certain operation as being "determined."

The term "connected" or "coupled" or a derivative thereof used in the present disclosure means any direct or indirect connection or coupling between two or more elements, and can include a case in which there are one or more intermediate elements between two elements "connected" or "coupled" to each other. The coupling or connection between elements may be physical coupling or connection, logical coupling or connection, or a combination thereof. In the case of use in the present disclosure, it can be conceived that two elements can be "connected" or "coupled" to each other by using one or more electrical wires, cables and/or printed electric connections and by using electromagnetic energy such as electromagnetic energy having a wavelength of a radio frequency band, a microwave band, and an optical (both visible and non-visible) band as several non-definitive and non-comprehensive examples.

The term "based on" used in the present disclosure does not mean "based only on," unless expressly specified otherwise. In other words, the phrase "based on" means both "based only on" and "based at least on."

When "include" and "including" and derivatives thereof are used in the present disclosure or claims, those terms are intended to be comprehensive like the term "comprising". Further, the term "or" used in the present disclosure or claims is intended not to be an exclusive OR.

In the present description, a plurality of devices are assumed to be included unless there is obviously only a single device in the context or technically.

The procedure, the sequence, the flowchart, and the like in each aspect/embodiment described in the present disclosure may be in a different order unless inconsistency arises. For example, for the method described in the present disclosure, elements of various steps are described in an exemplified order, but there is no limitation to the specific order described above.

Each aspect/embodiment described in the present disclosure may be used alone, may be used in combination, or may be used by being switched according to the execution. Also, a notification of predetermined information (e.g., a notification of "being X") is not limited to a notification performed explicitly, and may be performed implicitly (e.g., a notification of predetermined information is not performed).

Any reference to elements using the terms "first" and "second" used in the present disclosure do not generally limit quantities or order of the elements. Preferably, these terms may be used in the present description as a convenient method of distinguishing two or more elements. Therefore, a reference to first and second elements does not mean that only two elements may be employed therein or that the first element must precede the second element in some type.

In the entire present disclosure, the singular forms of "a," "an," and "the" are assumed to include plural referents unless the context clearly dictates otherwise. Accordingly, if a "device" is described, the "device" includes a single device and a plurality of devices.

REFERENCE SIGNS LIST 1, 2 Communication system
10 UE
20 eNB
30 MME
40A First SGW
40B Second SGW
41 SGW-C
42A First SGW-U
42B Second SGW-U
50 PGW
51 PGW-C
52 PGW-U

The invention claimed is:

1. A connection control method implemented by a communication system including a user equipment (UE), first and second Serving Gateways (SGWs) which are devices for controlling transmission and reception of data of the UE, and a connection control device for performing processing related to establishment of first and second communication paths, wherein the first communication path is provided between the first SGW and the UE and the second communication path is provided between the second SGW and the UE, the connection control method comprising:
  receiving, by the connection control device, from the first SGW, a path establishment request related to the first communication path;
  starting, by the connection control device, processing to simultaneously create all of the first and second communication paths for the first and second SGWs respectively in accordance with the path establishment request from the first SGW only; and
  updating, by the connection control device, information related to an establishment status of the communication path associated with the UE stored in a storage circuit on the basis of an establishment result of the first and second communication paths.

2. A connection control device included in a communication system including a user equipment (UE), first and second Serving Gateways (SGWs) which are devices for controlling transmission and reception of data of the UE, the connection control device performing processing related to establishment of first and second communication paths, wherein the first communication path is provided between the first SGW and the UE and the second communication path is provided between the second SGW and the UE, the connection control device comprising:
  circuitry including at least a processor and configured to store information related to an establishment status of a communication path in the UE for each UE;
  receive, from the first SGW, a path establishment request related to the first communication path;
  start processing to simultaneously create all of the first and second communication paths for the first and second SGWs respectively in accordance with the path establishment request from the first SGW only; and
  update the stored information related to an establishment status of the communication path associated with the UE on the basis of an establishment result of the first and second communication paths.

3. A connection control device included in a communication system including a user equipment (UE), first and second Serving Gateways (SGWs) which are devices for controlling transmission and reception of data of the UE, and the connection control device for performing processing related to establishment of first and second communication paths, wherein the first communication path is provided between the first SGW and the UE and the second communication path is provided between the second SGW and the UE, the connection control device comprising:

circuitry including at least a processor and configured to
store information related to an establishment status of a communication path in the UE for each UE and each of the first and second SGWs device to which the UE can be connected;
receive, from the first SGW, a path establishment request related to the first communication path;
start processing to simultaneously create all of the first and second communication paths for the first and second SGWs respectively in accordance with the path establishment request is received from the first SGW only; and
update the stored information related to the establishment status of the first communication path and the second communication path.

* * * * *